(12) United States Patent
Blevins

(10) Patent No.: US 7,627,631 B2
(45) Date of Patent: Dec. 1, 2009

(54) SYSTEMS AND METHODS FOR COLLABORATIVE BUSINESS PLUG-INS

(75) Inventor: Mike Blevins, Volcano, CA (US)

(73) Assignee: Bea Systems, Inc., Redwood Shores, CA (US)

( * ) Notice: Subject to any disclaimer, the term of this patent is extended or adjusted under 35 U.S.C. 154(b) by 688 days.

(21) Appl. No.: 10/404,296

(22) Filed: Apr. 1, 2003

(65) Prior Publication Data

US 2004/0068728 A1 Apr. 8, 2004

Related U.S. Application Data

(60) Provisional application No. 60/377,157, filed on May 2, 2002.

(51) Int. Cl.
*G06F 15/16* (2006.01)
(52) U.S. Cl. ...................................... 709/205; 719/328
(58) Field of Classification Search ................ 709/202, 709/204; 717/109, 315, 328
See application file for complete search history.

(56) References Cited

U.S. PATENT DOCUMENTS

| | | | | |
|---|---|---|---|---|
| 5,321,841 A | 6/1994 | East et al. | ..................... | 395/725 |
| 5,604,860 A | 2/1997 | McLaughlin | ................ | 715/866 |
| 5,630,131 A | 5/1997 | Palevich | ...................... | 717/108 |
| 5,748,975 A | 5/1998 | Van De Vanter | ............ | 395/793 |
| 5,801,958 A | 9/1998 | Dangelo | ....................... | 716/18 |
| 5,835,769 A | 11/1998 | Jervis et al. | .................. | 395/701 |
| 5,836,014 A | 11/1998 | Faiman, Jr. | .................. | 717/156 |
| 5,862,327 A | 1/1999 | Kwang et al. | ................ | 395/200 |
| 5,867,822 A | 2/1999 | Sankar | .......................... | 705/8 |
| 5,933,838 A | 8/1999 | Lomet | ......................... | 707/202 |
| 5,946,316 A | 8/1999 | Chen et al. | | |
| 5,950,010 A | 9/1999 | Hesse et al. | ................. | 395/712 |
| 5,961,593 A | 10/1999 | Gabber et al. | ............... | 709/219 |
| 5,966,535 A | 10/1999 | Benedikt | ..................... | 717/147 |
| 6,012,083 A | 1/2000 | Savitzky | ..................... | 709/202 |

(Continued)

FOREIGN PATENT DOCUMENTS

CA 2 248 634 A1 3/2000

(Continued)

OTHER PUBLICATIONS

Paul, Laura Gibbone, "RosettaNet: Teaching business to work together", Oct. 1, 1999. http://www.developer.com/xml/article.php/616641.

(Continued)

*Primary Examiner*—Salad Abdullahi
(74) *Attorney, Agent, or Firm*—Fliesler Meyer LLP

(57) ABSTRACT

Business logic plug-ins can be implemented as Java classes that perform specialized processing of business messages as those messages pass through an integration engine, such as a "B2B" engine for business-to-business messaging. Logic plug-ins can insert rules and business logic along the path traveled by business messages as they make their way through the B2B engine. Logic plug-ins can be defined and stored in an integration repository and executed in the B2B engine, and can be transparent to users. The plug-ins can utilize a plug-in framework, composed of a plug-in manager, as well as interfaces and mechanisms for plug-ins to implement. A plug-in manager can manage all plug-ins in the framework, can be a concrete implementation of the plug-in framework on the server, and can be a central hub through which all plug-in related client requests are routed.

This description is not intended to be a complete description of, or limit the scope of, the invention. Other features, aspects, and objects of the invention can be obtained from a review of the specification, the figures, and the claims.

24 Claims, 5 Drawing Sheets

U.S. PATENT DOCUMENTS

| | | | | |
|---|---|---|---|---|
| 6,018,730 | A | 1/2000 | Nichols | 706/45 |
| 6,023,578 | A | 2/2000 | Birsan | 717/105 |
| 6,023,722 | A | 2/2000 | Colyer | |
| 6,028,997 | A | 2/2000 | Leymann | 717/104 |
| 6,029,000 | A | 2/2000 | Woolsey | 717/147 |
| 6,044,217 | A | 3/2000 | Brealey et al. | 395/701 |
| 6,067,548 | A | 5/2000 | Cheng | 707/103 |
| 6,067,623 | A | 5/2000 | Blakeley, III et al. | 713/204 |
| 6,070,184 | A | 5/2000 | Blount | 709/202 |
| 6,085,030 | A | 7/2000 | Whitehead et al. | 395/200.33 |
| 6,092,102 | A | 7/2000 | Wagner | 340/7.29 |
| 6,119,149 | A | 9/2000 | Notani | 709/205 |
| 6,141,686 | A | 10/2000 | Jackowski et al. | 709/224 |
| 6,141,701 | A | 10/2000 | Whitney | 710/5 |
| 6,148,336 | A | 11/2000 | Thomas | |
| 6,189,044 | B1 | 2/2001 | Thomson | |
| 6,212,546 | B1 | 4/2001 | Starkovich | 709/203 |
| 6,222,533 | B1 | 4/2001 | Notani | 715/733 |
| 6,226,675 | B1 | 5/2001 | Meltzer et al. | 709/223 |
| 6,230,287 | B1 | 5/2001 | Pinard et al. | 714/31 |
| 6,237,135 | B1 | 5/2001 | Timbol | 717/1 |
| 6,243,737 | B1 | 6/2001 | Flanagan | 709/202 |
| 6,243,778 | B1 | 6/2001 | Fung et al. | |
| 6,282,711 | B1 | 8/2001 | Halpern et al. | 717/11 |
| 6,292,932 | B1 | 9/2001 | Baisley | 717/114 |
| 6,330,569 | B1 | 12/2001 | Baisley | 707/203 |
| 6,336,122 | B1 | 1/2002 | Lee et al. | 707/204 |
| 6,338,064 | B1 | 1/2002 | Ault et al. | 707/9 |
| 6,343,265 | B1 | 1/2002 | Glebov | 703/25 |
| 6,345,283 | B1 | 2/2002 | Anderson | |
| 6,348,970 | B1 | 2/2002 | Marx | |
| 6,349,408 | B1 | 2/2002 | Smith | 717/11 |
| 6,353,923 | B1 | 3/2002 | Bogle et al. | 717/4 |
| 6,360,221 | B1 | 3/2002 | Gough | |
| 6,377,939 | B1 * | 4/2002 | Young | 705/34 |
| 6,393,605 | B1 | 5/2002 | Loomans | 717/121 |
| 6,408,311 | B1 | 6/2002 | Baisley | 707/203 |
| 6,411,698 | B1 | 6/2002 | Bauer | 379/207.01 |
| 6,442,592 | B1 * | 8/2002 | Alumbaugh et al. | 709/206 |
| 6,445,711 | B1 | 9/2002 | Scheel | 370/402 |
| 6,463,503 | B1 | 10/2002 | Jones et al. | 711/114 |
| 6,470,364 | B1 | 10/2002 | Prinzing | 715/530 |
| 6,549,949 | B1 | 4/2003 | Bowman-Amuah | 709/236 |
| 6,560,769 | B1 | 5/2003 | Moore | 717/100 |
| 6,567,738 | B2 | 5/2003 | Gopp | 701/109 |
| 6,594,693 | B1 | 7/2003 | Borwankar | 709/219 |
| 6,594,700 | B1 | 7/2003 | Graham | 709/230 |
| 6,604,198 | B1 | 8/2003 | Beckman et al. | 713/167 |
| 6,637,020 | B1 | 10/2003 | Hammond | 717/107 |
| 6,643,652 | B2 | 11/2003 | Helgeson | 707/10 |
| 6,654,932 | B1 | 11/2003 | Bahrs | 715/507 |
| 6,678,518 | B2 | 1/2004 | Eerola | 455/422.1 |
| 6,687,702 | B2 | 2/2004 | Vaitheeswaran | 707/10 |
| 6,687,848 | B1 | 2/2004 | Najmi | 714/4 |
| 6,721,779 | B1 | 4/2004 | Maffeis | 709/202 |
| 6,732,237 | B1 | 5/2004 | Jacobs et al. | 711/119 |
| 6,748,420 | B1 | 6/2004 | Quatrano | 709/205 |
| 6,757,689 | B2 | 6/2004 | Battas | 707/101 |
| 6,772,188 | B1 * | 8/2004 | Cloutier | 709/224 |
| 6,789,054 | B1 | 9/2004 | Makhlouf | 703/6 |
| 6,795,967 | B1 | 9/2004 | Evans et al. | 719/310 |
| 6,802,000 | B1 | 10/2004 | Greene et al. | 713/168 |
| 6,804,686 | B1 | 10/2004 | Stone et al. | 707/104.1 |
| 6,832,238 | B1 | 12/2004 | Sharma | 709/201 |
| 6,847,981 | B2 | 1/2005 | Song | 707/104.1 |
| 6,850,893 | B2 | 2/2005 | Lipkin | |
| 6,850,979 | B1 | 2/2005 | Saulpaugh | 709/225 |
| 6,853,876 | B2 | 2/2005 | Wehrung et al. | |
| 6,889,244 | B1 | 5/2005 | Gaither | 709/202 |
| 6,915,519 | B2 | 7/2005 | Williamson | 719/313 |
| 6,918,084 | B1 | 7/2005 | Slaughter | 715/513 |
| 6,947,943 | B2 | 9/2005 | DeAnna | |
| 6,950,872 | B2 * | 9/2005 | Todd, II | 709/227 |
| 6,959,307 | B2 | 10/2005 | Apte | 707/104.1 |
| 6,963,914 | B1 | 11/2005 | Breitbart | 709/226 |
| 6,976,086 | B2 | 12/2005 | Sadeghi | 709/236 |
| 6,983,421 | B1 * | 1/2006 | Lahti et al. | 715/763 |
| 7,007,088 | B1 | 2/2006 | Najmi | |
| 7,017,146 | B2 | 3/2006 | Dellarocas | 717/106 |
| 7,039,671 | B2 | 5/2006 | Cullen | |
| 7,051,072 | B2 | 5/2006 | Stewart | 709/204 |
| 7,051,316 | B2 | 5/2006 | Charisius | 717/103 |
| 7,054,858 | B2 | 5/2006 | Sutherland | 707/4 |
| 7,062,718 | B2 | 6/2006 | Kodosky | 715/771 |
| 7,072,934 | B2 | 7/2006 | Helgeson | 709/203 |
| 7,076,772 | B2 | 7/2006 | Zatloukal | 717/147 |
| 7,107,578 | B1 | 9/2006 | Alpern | 717/124 |
| 7,111,243 | B1 | 9/2006 | Ballard | 715/744 |
| 7,117,504 | B2 | 10/2006 | Smith | 709/201 |
| 7,127,704 | B2 | 10/2006 | Van De Vanter | 717/112 |
| 7,391,735 | B2 | 6/2008 | Johnson | |
| 2001/0032263 | A1 | 10/2001 | Gopal et al. | |
| 2002/0004848 | A1 | 1/2002 | Sudarshan et al. | |
| 2002/0010781 | A1 | 1/2002 | Tuatini | |
| 2002/0010803 | A1 | 1/2002 | Oberstein et al. | |
| 2002/0016759 | A1 | 2/2002 | Marcready et al. | |
| 2002/0035604 | A1 | 3/2002 | Cohen | |
| 2002/0049788 | A1 * | 4/2002 | Lipkin et al. | 707/513 |
| 2002/0073080 | A1 | 6/2002 | Lipkin | |
| 2002/0073236 | A1 | 6/2002 | Helgeson | |
| 2002/0083075 | A1 * | 6/2002 | Brummel et al. | 707/102 |
| 2002/0095480 | A1 * | 7/2002 | Drummond et al. | 709/218 |
| 2002/0111922 | A1 | 8/2002 | Young | |
| 2002/0120685 | A1 | 8/2002 | Srivastava | |
| 2002/0147757 | A1 * | 10/2002 | Day et al. | 709/1 |
| 2002/0152106 | A1 | 10/2002 | Stoxen | |
| 2002/0165936 | A1 | 11/2002 | Alston et al. | |
| 2002/0174178 | A1 | 11/2002 | Stawikowski | |
| 2002/0174241 | A1 | 11/2002 | Beged-Dov et al. | |
| 2002/0184145 | A1 | 12/2002 | Sijacic et al. | |
| 2002/0184610 | A1 * | 12/2002 | Chong et al. | 717/109 |
| 2002/0194244 | A1 * | 12/2002 | Raventos | 709/101 |
| 2002/0194267 | A1 | 12/2002 | Flesner | |
| 2002/0194495 | A1 | 12/2002 | Gladstone | |
| 2003/0004746 | A1 | 1/2003 | Kheirolomoom | |
| 2003/0005181 | A1 | 1/2003 | Bau | |
| 2003/0007645 | A1 * | 1/2003 | Ofir | 380/282 |
| 2003/0014439 | A1 | 1/2003 | Boughannam | |
| 2003/0018665 | A1 | 1/2003 | Dovin et al. | |
| 2003/0018832 | A1 | 1/2003 | Amirisetty | |
| 2003/0043191 | A1 | 3/2003 | Tinsley | |
| 2003/0046266 | A1 | 3/2003 | Mullins et al. | |
| 2003/0055868 | A1 | 3/2003 | Fletcher | |
| 2003/0055878 | A1 | 3/2003 | Fletcher | |
| 2003/0074467 | A1 | 4/2003 | Oblak et al. | |
| 2003/0084203 | A1 | 5/2003 | Yoshida | |
| 2003/0097345 | A1 * | 5/2003 | Upton | 705/401 |
| 2003/0110117 | A1 | 6/2003 | Saidenberg et al. | |
| 2003/0110446 | A1 | 6/2003 | Nemer | |
| 2003/0126136 | A1 | 7/2003 | Omoigui | |
| 2003/0149791 | A1 | 8/2003 | Kane | |
| 2003/0167358 | A1 | 9/2003 | Marvin | |
| 2003/0196168 | A1 | 10/2003 | Hu | |
| 2003/0233631 | A1 | 12/2003 | Curry | |
| 2004/0019645 | A1 | 1/2004 | Goodman | |
| 2004/0025057 | A1 * | 2/2004 | Cook | 713/201 |
| 2004/0068568 | A1 | 4/2004 | Griffin | |
| 2004/0078373 | A1 * | 4/2004 | Ghoneimy et al. | 707/10 |
| 2004/0133660 | A1 | 7/2004 | Junghuber et al. | |
| 2004/0148336 | A1 | 7/2004 | Hubbard | |
| 2004/0150673 | A1 * | 8/2004 | Dobronsky | 345/810 |
| 2004/0204976 | A1 * | 10/2004 | Oyama et al. | 705/7 |
| 2004/0216086 | A1 | 10/2004 | Bau | |
| 2004/0225995 | A1 | 11/2004 | Marvin et al. | |

| | | |
|---|---|---|
| 2004/0260715 A1 | 12/2004 | Mongeon |
| 2005/0278585 A1 | 12/2005 | Spencer |
| 2006/0206856 A1 | 9/2006 | Breeden |

FOREIGN PATENT DOCUMENTS

| | | |
|---|---|---|
| WO | WO 00/29924 A | 5/2000 |
| WO | 01/90884 A2 | 11/2001 |

OTHER PUBLICATIONS

"Introducing Microsoft DotNet"; by ChristopheLauer, Jul. 2, 2002; http://web.archive.org/web/20020702162429/http://www.freevbcode.com/ShowCode.asp?ID=2171; pp. 1-10.

Hewlett-Packard, *HP Application Server*, Technical Guide Version 8.0, HP, Nov. 15, 2001, pp. 1-234.

Sun Microsystems, *iPlanet Application Server 6.0 White Paper*, iPlanet E-Commerce Solutions, May 25, 2000, pp. 1-104.

Enrique Duvos & Azer Bestavros, *An Infrastructure for the Dynamic Distribution of Web Application and Services*, Department of Computer Science Boston University, Dec. 2000, pp. 1-104.

Ed Roman & Rickard Öberg, *The Technical Benefits of EJB and J2EE Technologies over COM+ and Windows DNA*, Enterprise Edition (J2EE) Technologies, Dec. 1999, pp. 1-24.

Marcello Mariucci, *Enterprise Application Server Development Environments*, University of Stuttgart, Oct. 10, 2000, pp. 1-30.

Embury, S.M., et al., "Assisting the Comprehension of Legacy Transactions," Proceedings of the 8th Working Conference on Reverse Engineering, Oct. 2-5, 2001, pp. 345-354.

Mays, E., et al., "A Persistent Store for Large Shared Knowledge Bases," IEEE Transactions on Knowledge and Data Engineering, vol. 3, No. 1, Mar. 1991, pp. 33-41.

Tang, C., et al., "Integrating Remote Invocation and Distributed Shared State," Proceedings of the 18th International Parallel and Distributed Processing Symposium, IEEE, Apr. 26-30, 2004.

Java™ Debugging Interface—definition, retrieved from <URL http://java.sun.com/j2se/1.4.2/docs/guide/jpda/jdi/overview-summary.html on Feb. 21, 2007.

Hewlett-Packard Company, "hp application server," developer's guide version 8.0, 1999-2001, pp. 27-81, 127-160, 195-271.

Kilgore, R.A., "Multi-language, open-source modeling using the Microsoft.NET Architecture," Proceedings of the 2002 Winter Simulation Conference, IEEE, pp. 629-633.

Bogunovic, N., "A Programming Model for Composing Data-Flow Collaborative Applications," *ecbs*, p. 106, IEEE Conference and Workshop on Engineering of Computer-Based Systems, 1999.

Sung, S.Y., et al., "A Multimedia Authoring Tool for the Internet," Proceedings of the 1997 IEEE International Symposium on Consumer Electronics, Dec. 1997, pp. 304-308.

Smith, M., et al., "Marching Towards a Software Resuse Future," ACM SIGAda Ada Letters, vol. XIV, Issue 6, Nov./Dec. 1994, pp. 62-72.

Allamaraju, et al., "The J2EE Connector Architecture, Professional Java Server Programming J2EE 1.3 Edition," Sep. 2001, pp. 1009-1057.

Sun Microsystems, "J2EE™ Connector Architecture Specification, Version 1.0, Final Release," Aug. 16, 2001.

HP, "NonStop Tuxedo Release Guide 8.0", Nov. 2002, 23 pages.

Sosnoski, "XML and Java Technologies: Data binding, Part 1: Code generation approaches—JAXB and more," IBM, pp. 1-11, Jan. 2003.

Erich Liebmann et al., "Adaptive Data Dissemination and Caching for Edge Service Architectures built with the J2EE," Mar. 2004, ACM Press, 2004 ACM Symposium on Applied Computing, pp. 1717-1724.

Chen et al., "eCo Architecture to Electronic Commerce Interoperability," Jun. 29, 1999, CommerceNet.

Kunisetty, S., "Workflow Modeling and Simulation Using an Extensible Object-Oriented Knowledge Base Management System," CiteSeer, 1996, pp. 1-60.

Van der Aalst, et al., "Verification of XRL: An XML-Based Workflow Language," IEEE, Jul. 2001, pp. 427-432.

Blake, "Rule-Driven Coordination Agents: A Self-Configurable Agent Architecture for Distributed Control," IEEE, Mar. 2001, pp. 271-277.

Dahalin, et al., "Workflow Interoperability Using Extensible Markup Language (XML)", IEEE, Jul. 2002, pp. 513-516.

Lauer, Christophe, "Introducing Microsoft DotNet," Jul. 2, 2002, pp. 4-5.

\* cited by examiner

US 7,627,631 B2

SYSTEMS AND METHODS FOR COLLABORATIVE BUSINESS PLUG-INS

CLAIM OF PRIORITY

This application claims priority to U.S. Provisional Patent Application No. 60/377,157, filed May 2, 2002, entitled "SYSTEM AND METHOD FOR COLLABORATIVE BUSINESS PLUG-INS," which is hereby incorporated herein by reference.

CROSS REFERENCE TO RELATED PATENT DOCUMENTS:

The following co-pending U.S. patent documents are assigned to BEA Systems, Inc., the assignee of the present application, and these documents are hereby incorporated herein by reference:

(A) U.S. patent application Ser. No. 10/404,552 filed Apr. 1, 2003, inventor Michael Blevins and entitled, "COLLABORATIVE BUSINESS PLUG-IN FRAMEWORK";

(B) U.S. patent application Ser. No. 10/404,684 filed Apr. 1, 2003, inventor Michael Blevins and entitled, "SYSTEMS AND METHODS FOR BUSINESS PROCESS PLUG-IN DEVELOPMENT".

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The invention relates to adding functionality to existing applications.

BACKGROUND

In an e-business world, businesses must perform effectively at a rapid pace. To achieve this level of performance, many companies automate their business processes by using a business process management system: a system that defines, manages, and executes business processes using software. The order in which business activities are executed in the process is driven by a computer representation of the process called a workflow.

A workflow automates a business process by controlling the sequence of activities in the process, and by invoking the appropriate resources required by the various activities in the process. These resources might be software components that perform a required activity, or they might be people who respond to messages generated by the business process.

To achieve this level of workflow automation, a workflow management system provides support in three broad areas. The first area involves workflow definition and execution, or capturing the definition of the workflow, managing the execution of workflow processes in an operational environment, and sequencing the various activities to be performed. The second area involves data administration, or managing the people involved in a workflow, rerouting tasks when needed, and maintaining business calendars that govern the schedule of workflow activities. The third area involves workflow monitoring, or tracking the status of workflow processes, and dynamically configuring the workflow at run time.

An integration system can support all three areas of workflow management. An automated business process will not, however, entirely replace people with computers. People still wish to be involved in these otherwise automated processes, either by making discretionary decisions or by handling exceptions or problems as they arise.

BRIEF SUMMARY

Business logic plug-ins can be implemented as Java classes that perform specialized processing of business messages as those messages pass through an integration engine, such as a "B2B" engine for business-to-business (B2B) messaging. Logic plug-ins can insert rules and business logic along the path traveled by business messages as they make their way through the B2B engine. Router and filter logic plug-ins can be provided for each protocol used for business messaging. A service provider or trading partner can develop and install custom logic plug-ins to provide additional value in hub-and-spoke configuration. Logic plug-ins can be defined and stored in an integration repository and executed in the B2B engine. Logic plug-ins also can be transparent to users.

Plug-ins can utilize a plugin framework, which can be composed of a plug-in manager, a set of interfaces for plug-ins to implement, and a set of mechanisms for plug-ins to implement. These mechanisms can include plug-in notification mechanisms, plug-in lifecycle controls, metadata retrieval mechanisms, object manufacturing and downloading mechanisms, XML parsers, plug-in instance monitoring, and type checking. A plug-in manager can manage all plug-ins in the framework, and can be a concrete implementation of the plug-in framework on the server. The plug-in manager can be the central hub through which all plug-in related client requests are routed.

A plug-in can be designed and implemented as an Enterprise JavaBean (EJB). In order for a plug-in manager to manipulate all plug-ins, certain interfaces can be implemented. Each plug-in can have a home interface that can enable a plug-in manager to detect deployed plug-ins, such as by traversing a JNDI tree. A plug-in can also have a remote interface.

Other features, aspects and objects of the invention can be obtained from a review of the specification, the figures, and the claims.

DETAILED DESCRIPTION

Figure 1:
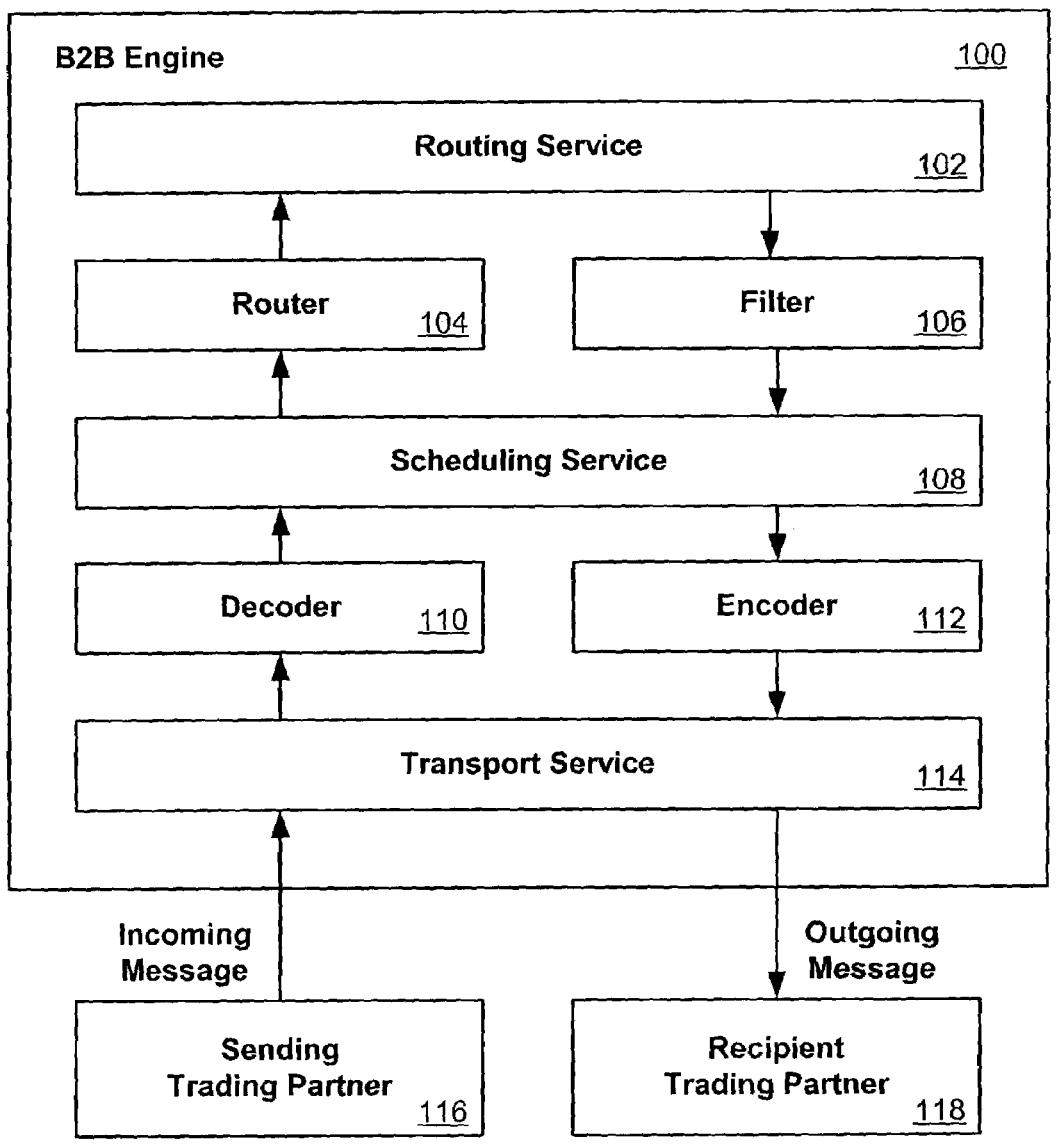
FIG. 1 is a diagram of a business-to-business engine that can be used in accordance with one embodiment of the present invention.

Systems and methods in accordance with embodiments of the present invention can take advantage of a plug-in framework to achieve seamless system integration with external products and technologies. Such a framework can allow third-party developers to extend the functionality of an integration system, for example, by writing integration-specific plug-ins. An exemplary plug-in is a run-time loadable class that can be used to extend system functionality. Plug-ins can be used to modify the definition and run-time behavior of actions, dones, events, functions, message types, starts, template properties, template definition properties, and variable types, for example. Plug-ins can respond to workflow instances and lifecycle notifications, as well as to template and template definition lifecycle notifications. A plug-in framework can have administrative capability that detects and configures plug-ins loaded simultaneously.

A plug-in framework can allow plug-ins to extend properties for template and template definition nodes. A framework can also allow plug-ins to add new actions and functions, as well as to define new types of start, event, and done nodes. A framework can enable an integration expression evaluator to interpret incoming plug-in provided data in any format using a common expression grammar. The framework can also provide a generic message handling facility that enables workflows to respond to an unlimited variety of message handling data formats and sources. The framework can support the importing and exporting of workflows containing plug-in supplied content. A framework can enforce strict type checking when defining business operation invocations that use plug-in defined variable types as their source or destination. A framework can also enforce the dependencies that templates and template definitions have on various plug-ins, and can handle cases when the pre-requisite plug-ins are not available.

A plug-in framework can prevent the execution of workflow instances when a required plug-in is not loaded. The framework can also provide the plug-in an opportunity to perform its own license checking during initialization. The framework can provide a plug-in license exception that a plug-in can throw if the plug-in needs to disable itself. Such a framework can also enable plug-ins to store and retrieve plug-in specific workflow instance data.

A plug-in framework can be composed of a plug-in manager, a set of interfaces for plug-ins to implement, and a set of mechanisms for plug-ins to implement. These mechanisms can include plug-in notification mechanisms, plug-in lifecycle controls, metadata retrieval mechanisms, object manufacturing and downloading mechanisms, XML parsers, plug-in instance monitoring, and type checking. The plug-in manager can manage all plug-ins in the framework, and can be a concrete implementation of the plug-in framework on the server. The plug-in manager can be the central hub through which all plug-in related client requests are routed.

A plug-in can be designed and implemented as an Enterprise JavaBean (EJB). In order for a plug-in manager to manipulate all plug-ins, certain interfaces can be required to be implemented. Each plug-in can be required to have a home interface that enables the plug-in manager to detect deployed plug-ins, such as by traversing a JNDI tree.

A plug-in can also have a remote interface. In an exemplary remote interface in accordance with one embodiment of the present invention, four groups of methods are implemented. The first group, lifecycle control, implements methods for initialization, exit, load, and unload. The second group deals with events, such as changing templates, changing template definitions, changing instances, or changing tasks. A third group deals with metadata and other plug-in information, and can include methods to get dependencies, get plug-in information, and get plug-in capabilities information. A fourth group can deal with object manufacturing, and include methods to get objects.

A plug-in manager can traverse a JNDI tree at startup to obtain a list of deployed plug-ins, initializing each plug-in. A plug-in may or may not be loaded, depending on its configuration. When the plug-in manager shuts down, it can unload and de-initialize all loaded plug-ins. A plug-in can be loaded into an integration system when a plug-in manager calls a load method on the plug-in. Once the plug-in is loaded, the plug-in is integrated into the integration system and all modules of the plug-in become visible to the client and server. A plug-in can be loaded or unloaded at startup, when the plug-in manager decides whether or not to load or unload a plug-in based on its configuration, and at runtime when the plug-in manager decides whether or not to load or unload a plug-in based on an API request.

A plug-in can register itself as a listener of a plug-in notification. In one embodiment, handler methods are implemented to handle changes to a template, template definition, instance, or task. A plug-in can also supply empty implementations to any notification handlers to which the plug-in is not listening.

A plug-in implementation can reveal its meta data through a getPlug-inInfo( ) or similar method, and can return a lightweight value object to interested clients. It is not necessary in many embodiments to do any extra installation on a client for a plug-in. The client then has no knowledge of the classes that a plug-in defines. It can be the responsibility of the plug-in to manufacture, upon request, instances of its defined classes in a getObject( ) or similar method.

In order to expose plug-in properties specific to integration design-time clients, an abstract class such as InfoObject and a family of subclasses can be used. An info object class can have fields to hold the name of the plug-in, a plug-in-assigned identifier, a localized description exposed to and used by the user interface, and an array of fully qualified Java class names which can be used for object manufacturing.

In order to expose plug-in properties specific to integration design-time clients, an abstract class such as InfoObject and a family of subclasses can be used. An info object class can have fields to hold the name of the plug-in, a plug-in-assigned identifier, a localized description exposed to and used by the user interface, and an array of fully qualified Java class named that the info object references that can be used for object manufacturing.

The combination of plug-in name and identifier can provide a unique identifier for an info object inside the plug-in framework. Each integration object that allows customization can have its own info object for a plug-in defined event. The info object class can have methods for accessing properties and comparing objects.

Plug-in information and plug-in capabilities information classes can be entry points that are used to obtain all information about a plug-in. A lightweight plug-in information class can contain the descriptive information for a plug-in, while a heavier plug-in capabilities information class can provide a complete description of the capabilities of a plug-in. Both classes can be accessed through the getter methods of an EJB. For performance and security reasons, only plug-in objects may be exposed to clients.

A set of getter methods can be used to retrieve information exposed by a plug-in capabilities information class. Such information can include information about plug-in defined starts, events, dones, actions, templates, template definitions, functions, and variable types. It can be the responsibility of the plug-in to assign a unique identifier to each of the above objects. The plug-in can also be responsible for localizing these objects.

All info objects can share the same approach to class name retrieving and object manufacturing. An array can define the set of related classes that the plug-in must supply for each info object. The client can use indices to retrieve the class names of objects that the client requests. The plug-in manager can then create an instance.

Plug-ins can add plug-in defined actions or action categories to an integration-defined tree. When a user tries to add an action at the design time, an action tree consisting of both integration and plug-in-defined categories can appear. A plug-in can also add new categories to other existing categories at any level. It is then the responsibility of the plug-in to publish any additional categories so the categories can be seen by other plug-ins. A plug-in can be precluded from removing actions or sub-categories from an existing category.

Template Definition DTD Changes

In some embodiments, plug-in data must adhere to an XML DTD. This adherence allows a plug-in framework to recognize plug-in defined template nodes and action. The DTD of a template definition including plug-ins can list all the plug-ins under the root document element. An example for a workflow element is as follows:

```
<!ELEMENT Workflow (name, effective, changedby, changeddate,
    notes, idexpression, active, audit, nodes, variables, error-
    handlers?, plug-ins?)>
```

Each plug-in can describe its name, version, and vendor, such as by:

```
<!ELEMENT plug-in (#PCDATA)>
<!-- name is the plug-in name, version is the plug-in
    version number. ->
<!ATTLIST plug-in
    name CDATA #REQUIRED
    major-version CDATA #REQUIRED
    minor-version CDATA #REQUIRED
    vendor CDATA #REQUIRED
    url CDATA>
```

The data element inside a particular template definition element can grant access to all plug-in defined info objects by supplying name and identifier attributes, together, which uniquely identify the info object.

Types of Applications

Certain types of applications can be used for Business-to-Business (B2B) integration, including logic plug-ins, management applications, and messaging applications. Logic plug-ins can be used for customized routing, filtering, and information processing. Management applications can be used to monitor B2B integration activities. Messaging applications, such as extensible Open Collaboration Protocol (XOCP) applications that use an integration messaging API, can implement a trading partner role and can interact directly with the B2B engine to manage the conversation and handle business messages.

Logic Plug-Ins

Logic plug-ins can be Java classes that perform specialized processing of business messages as those messages pass through a B2B engine. Specifically, logic plug-ins can insert rules and business logic along the path traveled by business messages as they make their way through the B2B engine.

Router and filter logic plug-ins can be used for each business protocol. A service provider or trading partner can develop and install custom logic plug-ins to provide additional value in a hub-and-spoke configuration. Logic plug-ins can be defined and stored in an integration repository and executed in the B2B engine. The plug-ins can also be transparent to users.

Business Messages and Message Envelopes

A business message is a basic unit of communication that can be exchanged between trading partners in a conversation. A business message can contain the list of intended recipients for the message. A business message can be represented in a B2B integration API by a message interface, such as a b2b.protocol.messaging.Message interface. The following classes can implement this interface and represent protocol-specific business messages:

```
b2b.protocol.xocp.messaging.XOCPMessage
b2b.protocol.rosettanet.messaging.RNMessage
```

Upon receipt of a business message, a B2B engine can create a message envelope that acts as a container for the business message as it is processed through the B2B engine. Message envelopes can be instances of a b2b.protocol.messaging.MessageEnvelope class.

A message envelope can be used for routing purposes and is analogous to a paper envelope for a letter. The message envelope can contain the business message plus addressing information, such as the identity of the sender (return address) and a recipient of the business message (destination address). Message envelopes can also contain other information about the business message.

Run-Time Message Processing

A B2B integration engine that can be used in accordance with one embodiment of the present invention uses logic plug-ins, acting as either routers or filters, to direct the flow of business messages to trading partners. The following example illustrates how this process can be implemented for XOCP business messages.

In this example, a logic plug-in, acting as an XOCP router, determines the trading partners to which a message is sent, after a trading partner sends an XOCP business message to the B2B engine. The router logic plug-in is on the "send" side of message processing and determines the intended recipients for the message. Before the integration server sends the business message to a recipient trading partner, a second logic plug-in, acting as an XOCP filter, determines whether or not the trading partner should receive the message. The second filter logic plug-in is on the "receive" side of message processing. It can prevent a specific trading partner from receiving a specific business message.

Figure 2:
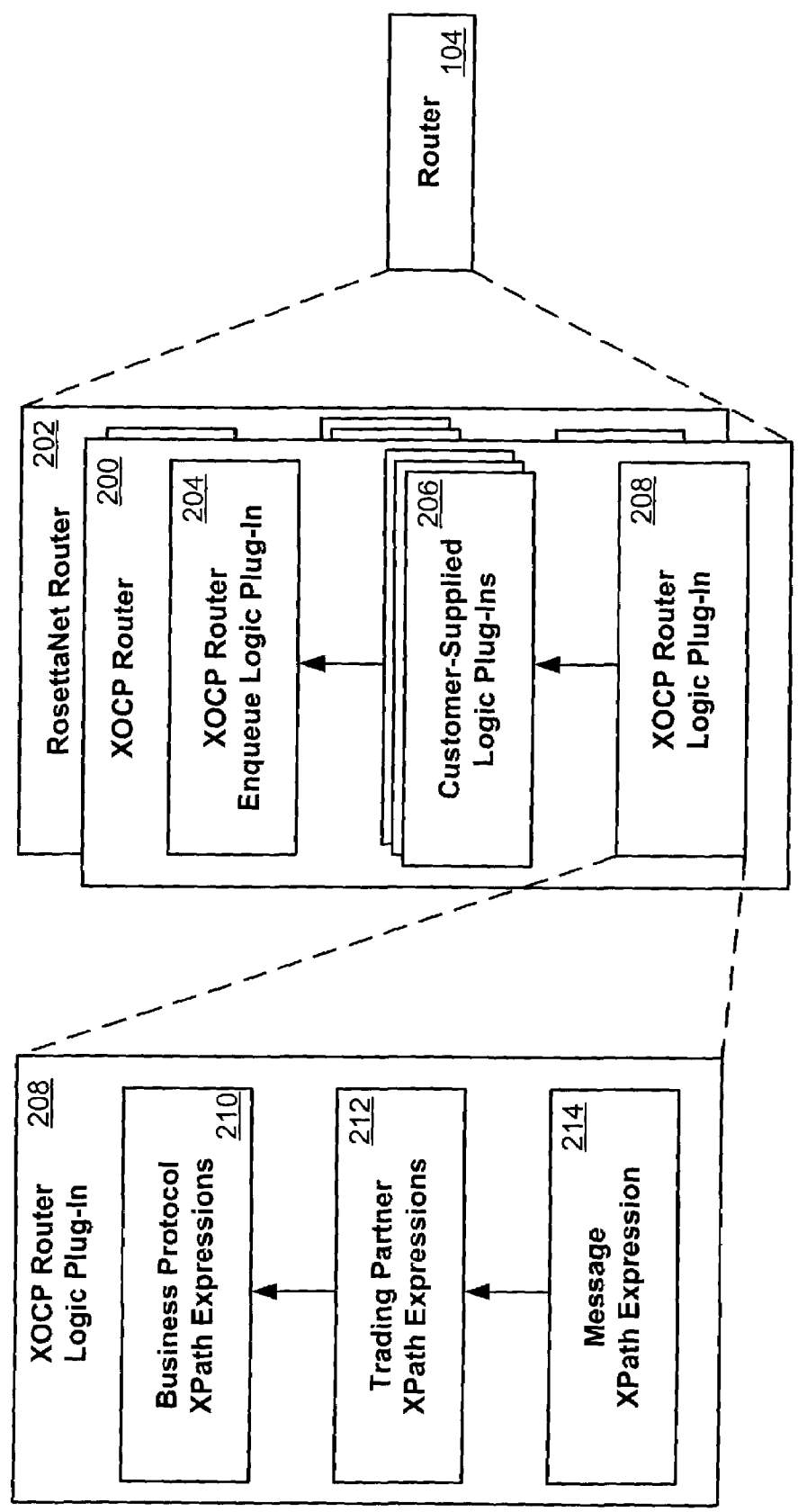
FIG. 2 is a diagram of a router that can be used in accordance with one embodiment of the present invention.
Figure 3:
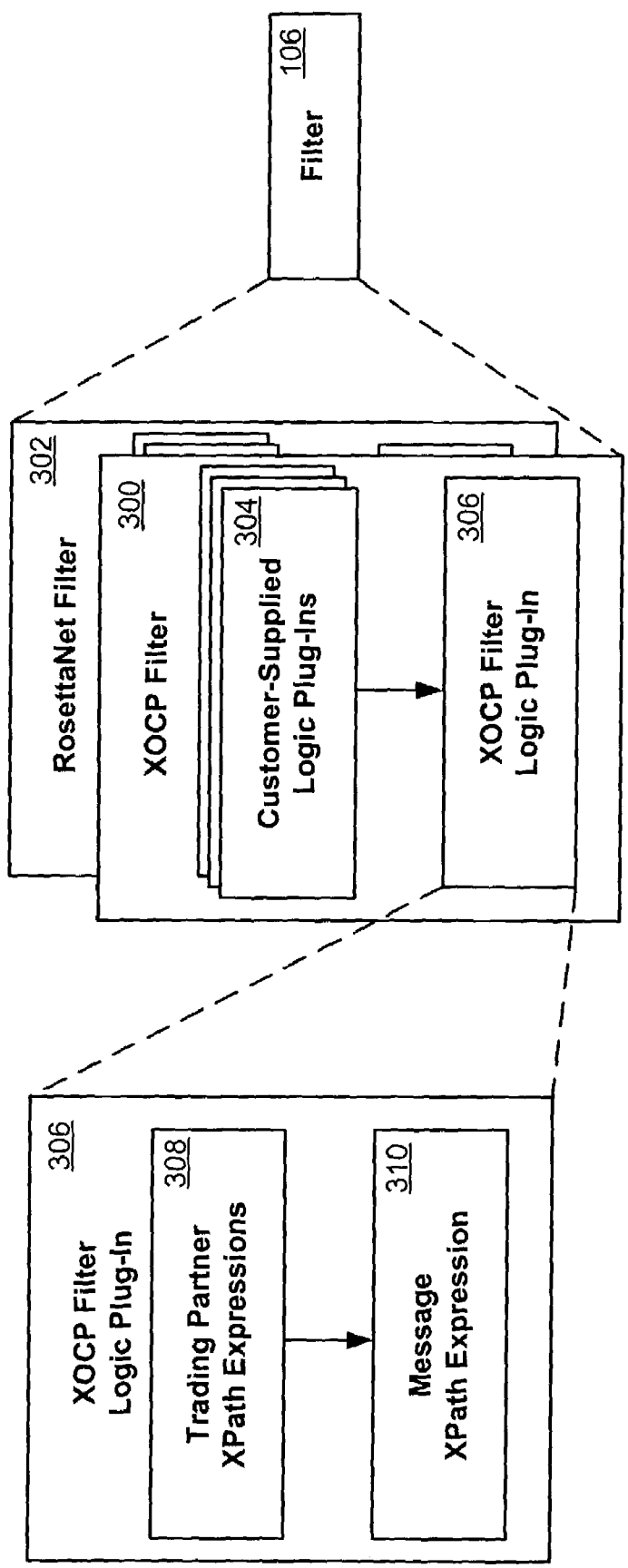
FIG. 3 is a diagram of a filter that can be used in accordance with one embodiment of the present invention.

FIG. 1 provides an overview of how a B2B engine can process a message. FIG. 2 provides a detailed look at the router 104 of FIG. 1. FIG. 3 provides a detailed look at the filter 106 of FIG. 1. Reference numbers for identical elements are carried over between figures for simplicity.

The send and receive sides of the B2B engine can process an XOCP business message in different manners. For the send side, when sending an incoming XOCP business message, the B2B engine 100 for the sending trading partner 116 can specify a message XML Path Language (XPath) expression that defines the intended recipients of the business message. This message XPath expression can be defined in a BPM workflow or in a locally-run B2B integration application.

A transport service 114 can read the incoming XOCP business message and can wrap the message in a message envelope to expedite processing as it travels through the B2B engine 100. The transport service 114 can forward the message to the appropriate decoder 110 based on the business protocol, such as XOCP, RosettaNet, or cXML. The URL at which the transport service 114 receives the message can identify the protocol and the delivery channel. Each delivery channel/business protocol combination can have a unique URL. A trading partner can then use this URL to access a particular delivery channel using a particular business protocol.

A decoder 110 can process the protocol-specific message headers. The decoder can identify the sending trading partner 116 and can enlist the sending trading partner in a conversation. The decoder can prepare a reply to return to the sender and forward the message to the scheduling service 108. The scheduling service can enqueue the message to store it for subsequent retrieval by the router 104, which can include an XOCP router 200 and a RosettaNet router 202.

An XOCP router 200 is a chain of logic plug-ins that can specify the recipients for the XOCP business message. Each logic plug-in 204, 206, 208 can add trading partners to, or remove trading partners from, a set of recipient trading partners. Logic plug-ins in an XOCP router 200 can be arranged in the following order:

1) XOCP router logic plug-in 208
2) Customer-supplied logic plug-ins 206
3) XOCP router enqueue logic plug-in 204

An XOCP router logic plug-in 208 can create a message-context document. A message-context document is an XML document that an XOCP router logic plug-in can generate from the XOCP business message and associated information in the repository. The message-context document can describe header and content information about the XOCP business message, such as the business protocol, conversation, sending trading partner, and receiving trading partners. The XOCP router logic plug-in can use a message XPath expression 214 to evaluate the message-context document.

An XOCP router logic plug-in can evaluate the message-context document against XPath routing expressions, which can refer to values in the message-context document. This evaluation can result in a set of trading partners that are targeted to receive the XOCP business message. The XOCP router logic plug-in 208 can use the XPath router expressions in the following exemplary order: message XPath expression 214, trading partner XPath router expression 212, and business protocol XPath router expressions 210.

Message XPath expressions 214 can be included in the business message and can therefore always apply to the routing of that business message. Trading partner XPath router expressions 212 can be defined in the repository for the sending trading partner and apply to all XOCP business messages sent by that trading partner. Each sending trading partner can have multiple trading partner XPath router expressions.

Each trading partner XPath router expression can examine different parts of the message-context document and select a different set of recipient trading partners. The trading partners produced by each expression can either replace the previously generated set of recipient trading partners or add to the current set.

Business protocol XPath router expressions 210 can be defined in a repository and can apply to all XOCP business messages using a particular business protocol. As with trading partner XPath router expressions, each business protocol XPath router expression can examine different parts of the message-context document and select a different set of recipient trading partners. The trading partners produced by each expression can either replace the previously generated set of recipient trading partners or add to the current set. XPath expressions can be added to the repository for use by the XOCP router logic plug-in.

The XOCP router logic plug-in 208 can then discard the message-context document. The B2B engine 100 can continue to process the message, unless the set of recipient trading partners is empty. In that case, the XOCP router logic plug-in will not forward the message to the next component for processing.

A user or customer can create customer-supplied logic plug-ins 206 and add them to the XOCP router 200. If a new logic plug-in is created, it can be added to the chain after the XOCP router logic plug-in 208 and before the XOCP router enqueue logic plug-in 204. The order of the logic plug-ins in the XOCP router chain can be specified in the XOCP business protocol definition.

A customer-supplied logic plug-in 206 does not have to provide router functionality to be part of an XOCP router 200. For example, a customer-supplied logic plug-in can provide billing functionality by keeping track of the number of messages sent by a particular sending trading partner and then billing the trading partner for those messages. Even when a customer-supplied logic plug-in does not provide routing or filtering functionality, it can be added only to the XOCP router 200 or the XOCP filter 300.

After customer-supplied router logic plug-ins are processed, the B2B engine 100 can continue to process the message, unless the set of recipient trading partners is empty. In that case, the customer-supplied router logic plug-in may not forward the message to the next component for processing.

An XOCP router enqueue logic plug-in 204 can enqueue the XOCP business message along with the intended recipients. The enqueue plug-in can then forward the message to the routing service 102. The routing service can perform the final validation of the message recipients. The routing service can create a separate message envelope for each validated recipient trading partner, and can forward each copy of the message envelope to the filter 106, which can include an XOCP filter 300 and a RosettaNet filter 302, for example.

On the receive side, an XOCP filter 300 can be used, which is a chain of logic plug-ins that can determine whether or not to send an XOCP business message to the intended recipient. These logic plug-ins can be evaluated after the XOCP router logic plug-ins, and can modify or override the XOCP router results. Each logic plug-in can determine not to send the message. The logic plug-ins in the XOCP filter 300 can be arranged in the following order:

1) Customer-supplied logic plug-ins 304
2) XOCP filter logic plug-in 306

An XOCP filter logic plug-in 306 can create a message-context document. A message-context document is an XML document that the XOCP filter logic plug-in 306 generates from the XOCP business message and associated information in the repository. The message-context document can describe header and content information about the XOCP business message, such as the business protocol, conversation, sending trading partner, and receiving trading partner. The XOCP filter logic plug-in can use XPath expressions to evaluate the message-context document.

An XOCP filter 300 can evaluate the message-context document against XPath filter expressions, which refer to values in the message-context document. This evaluation can determine whether or not to send the message to the intended recipient. The XOCP filter logic plug-in can use the XPath filter expressions, such as in the following order: trading partner XPath filter expressions 308 then business protocol XPath filter expressions 310.

Trading partner XPath filter expressions 308 can be defined in the repository for a recipient trading partner, and can apply to all XOCP business messages destined for that trading partner. Each recipient trading partner can have multiple trading partner XPath filter expressions. Each trading partner XPath filter expression can examine different parts of the message-context document and return a Boolean result that indicates acceptance or rejection of the message. Processing can continue until, for example, an expression evaluates to false or all expressions have been processed.

Business protocol XPath filter expressions 310 can be defined in the repository and can apply to all XOCP business messages. As with trading partner XPath filter expressions, each business protocol XPath filter expression can examine different parts of the message-context document and can return a Boolean result that indicates acceptance or rejection of the message. Processing can continue until an expression evaluates to false or all expressions have been processed. XPath expressions can be added to the repository for use by the XOCP filter logic plug-in.

The XOCP filter logic plug-in 306 can discard the message-context document. If the XOCP filter logic plug-in cancels delivery of the XOCP business message to the intended recipient, the XOCP filter logic plug-in will not forward the message to the next component in the B2B engine. Otherwise, the B2B engine 100 can continue to process the message.

Users or customers can create customer-supplied logic plug-ins 304 and add them to an XOCP filter. If a new logic plug-in is created, it can be added to the chain before the XOCP filter logic plug-in 306. The order of the logic plug-ins in the XOCP filter chain can be specified in the XOCP business protocol definition.

A customer-supplied logic plug-in 304 does not have to provide filter functionality to be part of the XOCP filter. For example, a customer-supplied logic plug-in can provide sampling functionality by keeping track of the types of messages sent to a particular recipient trading partner. Even when a customer-supplied logic plug-in does not provide routing or filtering functionality, it can be added only to the XOCP router or the XOCP filter.

If the customer-supplied logic plug-ins 304 cancel delivery of the XOCP business message to the intended recipient, the customer-supplied filter logic plug-in may not forward the message to the next component in the B2B engine. Otherwise, the B2B engine 100 can continue to process the message. A scheduling service 108 can perform additional internal operations related to quality of service issues and conversation management. The scheduling service can forward the message to the encoder 112. An encoder 112 can transform the message as necessary to support the business protocol and forward the message to the transport service 114. A transport service 114 can send the outgoing message to the recipient trading partner 118.

XPath Expressions

XPath is an XML path language that is defined by the World Wide Web Consortium. An XOCP router logic plug-in and an XOCP filter logic plug-in can use XPath expressions to evaluate message-context documents. XPath expressions can be added to the repository for use by the XOCP router logic plug-in and the XOCP filter logic plug-in.

XPath expressions in the XOCP router logic plug-in and XOCP filter logic plug-in can perform various functions. An XPath router expression can use the XPath syntax to select a set of trading partners from the message-context document. These trading partners are the intended recipients of the XOCP business message. Each XPath router expression can evaluate to a set of trading partners. In the XOCP router logic plug-in, XPath expressions can specify the business criteria for message distribution. For example, a buyer can use an XPath router expression to send bid requests to all sellers in a particular area code or to sellers that can handle large orders.

An XPath filter expression can use the XPath syntax to return a Boolean result that indicates acceptance or rejection of the message. Each XPath filter expression can evaluate to a Boolean result. In the XOCP filter logic plug-in, XPath expressions can determine whether or not the B2B engine sends a particular business message to a particular trading partner. An XPath filter expression in the XOCP filter logic plug-in can act as a gatekeeper that filters out unwanted business messages for a receiving trading partner. Table 1 provides an overview of the various types of XPath expressions.

TABLE 1

Overview of Types of XPath Expressions

| Type of XPath Expression | XOCP Router Logic Plug-In | XOCP Filter Logic Plug-In |
|---|---|---|
| Message | Evaluated: first<br># of XPath expressions: one<br>Defined in: BPM workflows or B2B Java applications<br>Purpose: defines recipients<br>Applies to: XOCP business messages from the sender BPM workflows or B2B application | Not applicable |
| Trading partner | Evaluated: second<br># of XPath expressions: one or more<br>Defined in: repository (via B2B Console or Bulk Loader)<br>Purpose: adds and removes recipients<br>Applies to: all XOCP business messages from the sender trading partner | Evaluated: fourth<br># of Xpath expressions: one or more<br>Defined in: repository (via B2B Console or Bulk Loader)<br>Purpose: determines whether or not to send the message to the recipient<br>Applies to: all XOCP business messages to the recipient trading partner |
| Business protocol | Evaluated: third<br># of XPath expressions: one or more<br>Defined in: repository (via B2B Console or Bulk Loader)<br>Purpose: adds and removes recipients<br>Applies to: all XOCP business messages from all sender trading partners | Evaluated: fifth<br># of Xpath expressions: one or more<br>Defined in: repository (via B2B Console or Bulk Loader)<br>Purpose: determines whether or not to send the message to the recipient<br>Applies to: all XOCP business messages to all recipient trading partners |

In an XOCP router logic plug-in, each XPath router expression can examine different parts of the message-context document and select a different set of recipient trading partners. The trading partners produced by each expression can either replace the previously generated set of recipient trading partners or add to the current set. Table 2 steps through an example that shows how XPath router expressions can be used.

TABLE 2

Example for XPath Router Expressions

| XPath Expression | Resulting Set of Recipient Trading Partners |
|---|---|
| The message XPath expression selects trading partners A and B. | A, B |
| The first trading partner XPath router expression adds trading partner C. | A, B, C |
| The second trading partner XPath router expression replaces all previously selected trading partners with trading partner D. | D |
| The first business protocol router expression, adds trading partners B and F. | D, B, F |
| The second business protocol router expression removes trading partner F. | D, B |

In an XOCP filter logic plug-in, each XPath filter expression can examine different parts of the message-context document to determine whether or not to forward the message to the recipient trading partner. Each XPath filter expression can return "true" or "false" using different selection criteria. When an XPath filter expression returns false, the message can be blocked from further evaluation and not sent to the intended recipient.

An XPath expression can refer to types of information, such as trading partner attributes. Trading partner attributes can include standard attributes, such as the trading partner name or a postal code, and extended attributes, or custom attributes defined in a B2B integration console. An XPath Expression can also refer to message information, such as the type of business document, a purchase order number, or an invoice amount.

Creating Message XPath Expressions

When sending an XOCP business message, a trading partner can specify a message XPath expression that defines the intended recipients for the business message. The message XPath router expression can be defined in a business process management workflow or in a B2B integration Java application. This XPath expression can select a subset of <trading-partner> nodes from the message-context XML document that the XOCP router logic plug-in generates.

The sending trading partner can define this XPath expression and send the expression along with the message. An XPath expression can be defined for B2B integration. If a BPM workflow is used to exchange business messages, the XPath expression can be defined in the workflow template and applied when a trading partner sends the message to another trading partner. If a Java application is used to exchange business messages, the XPath expression can be defined in the Java application. A setExpression method or similar method on a b2b.protocol.messaging.Message instance can be called, passing the XPath expression as the parameter.

In many cases, a trading partner may send a business message to another single, known trading partner, such as when replying to a request from that trading partner. In this case, the sending trading partner can bypass the evaluation of XPath expressions in the XOCP router logic plug-in by specifying the name of the recipient trading partner instead of an XPath expression. To specify a trading partner name, a setRecipient method can be called instead of setExpression on a b2b.protocol.messaging.Message instance.

Creating XPath Expressions

A trading partner XPath expression is an XPath expression defined for a trading partner. For routing, a trading partner XPath expression can be used by an XOCP router logic plug-in and can be defined for the sending trading partner. For filtering, a trading partner XPath expression can be used by the XOCP filter logic plug-in and can be defined for the receiving trading partner. Trading partner XPath expressions can be defined in the repository. Various tools can be used to create trading partner XPath expressions for the XOCP router logic plug-in and the XOCP filter logic plug-in.

A business protocol XPath expression is an XPath expression that can be defined in a repository for a particular business protocol. Business protocol XPath router expressions can apply to all incoming business messages using that protocol. Business protocol XPath filter expressions can apply to all outgoing XOCP business messages.

Logic Plug-Ins

Logic plug-ins are Java classes that can perform specialized processing of business messages, such as those messages that pass through a B2B engine. Plug-ins can be developed as custom services by integration providers, trading partners, or integration customers. Logic plug-ins can insert rules and business logic at strategic locations along the path traveled by business messages as they make their way through a B2B system. Logic plug-ins are instances of Java classes that can be created when business protocols are created. The plug-ins can be activated when a trading partner's delivery channel is started, and invoked when a message passes through the B2B engine.

Logic plug-ins can be business protocol-specific. These plug-ins can process messages that are exchanged using a particular business protocol. For example, if a particular plug-in is associated with the XOCP protocol, then that plug-in processes XOCP business messages.

A router logic plug-in and a filter logic plug-in can be utilized for supported business protocols. In addition to routing and filtering, custom logic plug-ins can perform a wide range of services. For example, for billing purposes, a custom logic plug-in can track the number of messages sent from each trading partner.

A logic plug-in can perform route modification tasks. A route modification task can change the list of intended recipients for a business message. List changes can be subject to any conversation and/or collaboration agreement validation of the recipient. Examples of route modification include situations such as "If a computer chip order over $1 M is placed, make sure that NewChipCo is one of the recipients" or "After Jan. 1, 2000, no orders should be sent to OldChipCo."

A logic plug-in can also perform examination tasks. An examination task can be used to examine the contents of a business message and take certain actions based on the results of the examination. This functionality can be provided by custom plug-ins. Systems can be set up so that the examination of business messages does not include encrypted contents. Examples of situations where examination tasks could be used include "Log all senders of messages for billing purposes" and "For messages of type X, how many are conversation version 1 versus conversation version 2?"

Chains

Routers and filters can consist of one or more logic plug-ins, which can be executed when a business message passes through the routers and filters. Multiple logic plug-ins that share the same business protocol can be sequenced as a logic plug-in chain.

In a chain, logic plug-ins can be processed sequentially at run time. After one logic plug-in has finished executing, the next logic plug-in in the chain can be activated. Each successive logic plug-in can access any changes made previously to shared message information as a business message is processed in the B2B engine. The position of a logic plug-in in a chain can be configured in a repository, such as through an integration console for B2B.

Even when custom XOCP logic plug-ins in the router do not provide routing or filtering capability, the plug-ins can still be part of a router or filter logic plug-in chain. In this example, the chain contains four logic plug-ins that are processed in order. These plug-ins include an XOCP router, an XOCP-MessageTracker, an XOCP-MessageInspector, and an XOCP router enqueue.

An XOCP router can be a system logic plug-in. This logic plug-in can modify the list of recipients for an XOCP business message based on XPath router expressions configured in the repository. This logic plug-in is the first one in the XOCP router chain, in at least some embodiments.

An XOCP-MessageTracker can be a custom logic plug-in. An integration owner or trading partner can provide such a custom logic plug-in to track the number of business messages sent from each trading partner for billing purposes.

An XOCP-MessageInspector can be a custom logic plug-in. An integration owner or trading partner can provide such a custom logic plug-in to examine and maintain statistics for the types of business documents being exchanged through a B2B engine, such as for example, purchase orders, and invoices.

An XOCP router enqueue can be a system logic plug-in. This logic plug-in can enqueue the XOCP business message in an internal B2B integration router message queue. This logic plug-in is the last one in the XOCP router chain, in at least some embodiments.

In this example, only XOCP business messages trigger the logic plug-ins in the XOCP router chain. Non-XOCP business messages, such as RosettaNet or cXML messages, are processed separately, such as by a router chain associated with those business protocols.

To provide standard services for processing business messages, offers the following logic plug-in chain can also be utilized. An XOCP router can modify the list of recipients for an XOCP business message based on XPATH router expressions configured in the repository. This system logic plug-in can be first in the router logic plug-in chain so that custom logic plug-ins can subsequently process a business message after its list of intended recipients is known.

An XOCP router enqueue plug-in can enqueue the XOCP business message in the B2B router message queue. The system logic plug-in in this example is last in the XOCP router logic plug-in chain. An XOCP filter can determine whether an XOCP business message is sent to a specific trading partner based on XPATH filter expressions configured in the repository. This system logic plug-in is last in the XOCP filter logic plug-in chain.

A RosettaNet router enqueue plug-in can enqueue the RosettaNet business message in the B2B router message queue. This system logic plug-in can be last in the RosettaNet router logic plug-in chain. A RosettaNet filter plug-in can determine whether a RosettaNet business message is sent to a specific trading partner. This system logic plug-in can be last in the RosettaNet filter logic plug-in chain.

In addition to using system logic plug-ins, trading partners can develop their own custom logic plug-ins to provide specialized services. Each such logic plug-in can be a Java class that implements a logic plug-in API.

Logic Plug-In API

A logic plug-in API can be utilized that allows B2B applications to add or remove target trading partners from the message recipient list when using XOCP multicast. Such an API can also allow B2B applications to retrieve, examine, and process parts of business messages. To ensure that the contents of business messages are not altered or misrepresented programmatically, the logic plug-in API can provide methods for examining business messages, but not for changing their contents.

A logic plug-in API can be made up of a number of components. These components can include classes and interfaces including, for example, b2b.protocol.Plug-in. This interface is a tagging interface that represents a generic logic plug-in, or code that can be inserted for execution into a router or a filter. A b2b.protocol.Plug-inException component is an exception class that can be thrown if an error occurs while a logic plug-in is being executed.

A b2b.protocol.messaging.MessageEnvelope component can represent the container, or envelope, for a business message. The MessageEnvelope can contain the actual business message plus high-level routing and processing information associated with the business message, such as the sender URL and the URL for one recipient. There can be a single message envelope for each recipient. A Java InputStream can be available in case access to the native message is needed. As message content modification may not be allowed, however, no OutputStream may be provided.

A b2b.protocol.messaging.Message interface can contain all of the information required for processing a business message in the B2B engine. It can provide information to be used to properly route a message between trading partners. It can contain information specific to the particular business protocol being used for this business message.

A b2b.protocol.messaging.PayloadPart component can represent a component of the message payload. Specific classes that implement this information can be provided for some of the different types of parts of a business message, such as XML or nonXML parts, or to assist in accessing business protocol-specific information.

A b2b.protocol.conversation.ConversationType component can represent a single role in a specific conversation definition. It can contain information such as the conversation name, conversation version, and trading partner role. A b2b.tpa.CAInstance can represent a collaboration agreement instance. The available methods can allow a user to retrieve a variety of information about the collaboration agreement. Because modification of the collaboration agreement may not be allowed from this API, only retrieval and verification methods may be provided.

A b2b.tpa.PartyInstance or similar instance can represent a party in a collaboration agreement. The available methods can allow a user to verify or retrieve information about the collaboration agreement party, such as the delivery channel used. A b2b.tpa.TradingPartnerInstance can represent a trading partner instance at run time. This can be used in conjunction with PartyInstance or in a stand-alone mode with a router or filter.

Rules and Guidelines for Logic Plug-Ins

Rules and guidelines can be set up, to which logic plug-ins can conform. For example, logic plug-ins can be thread-safe and, therefore, stateless. At run time, logic plug-in instances can be cached and shared by multiple threads. Using instance variables may not be recommended.

If access to shared resources is required, a synchronized Java keyword can be used to restrict access to the shared resource. Certain resources, such as instance variables within the class, shared objects, or external system resources, such as files, migh need shared access. Using the synchronized keyword can affect overall application performance, so it may be used only when necessary.

Logic plug-ins can modify the message envelope and the list of recipients, but may not be able to modify the message contents. Changing the business message can invalidate a digital signature, if present. The logic plug-in API can provide mutator methods for modifying the message envelope only.

Logic plug-ins can be self-contained, and may not be interdependent with other logic plug-ins. The plug-ins may not be able to exchange variables or return a variable. A message envelope may be the only input and the only output. If a logic plug-in makes a change to the message envelope, it can output the message envelope as modified. The main logic plug-in class can implement a b2b.protocol.Plug-in interface.

To ensure secure messaging, logic plug-ins may not be able to inspect encrypted business messages. The business messages that are examined can be those that do not have encrypted contents. To examine the encrypted contents of a business message, a logic plug-in can decrypt the message, inspect its contents, and then encrypt it again. Users can be required to have their own public key infrastructure. It can be the responsibility of the plug-in provider to ensure that any custom logic plug-ins that are installed are properly debugged and designed, from a security perspective at least.

A logic plug-in can be associated with at least one business protocol in the repository. The logic plug-in can be triggered only when a business message that uses that protocol passes through the B2B engine. For example, a RosettaNet business message may not trigger an XOCP logic plug-in, and vice versa.

A single logic plug-in can be associated with multiple protocols in the repository. For example, the same logic plug-in class named SentMessages can be associated with the XOCP and RosettaNet protocols. In a B2B console, a user can define separate logic plug-ins for each business protocol, such as XOCP-SentMessages, RN-SentMessages, and cXML-SentMessages, although each can point to the same SentMessages class. Alternatively, the same logic plug-in can be used in two different protocol chains. These chains can share initialization parameters, even though they are separate instances.

An efficient logic plug-in can quickly determine whether a business message qualifies for processing and, if not, can exit immediately. Logic plug-ins can call other modules, including shared methods in a utility library such as, for example, a module that accesses a database.

Logic plug-ins can be initialized one time, when the delivery channel is activated. If the delivery channel is shut down, such as if a shutdown method is called on an associated DeliveryChannelMBean, all protocol-specific logic plug-ins associated with that delivery channel can be shut down as well. The delivery channel can be restarted for the logic plug-ins to be active. If the B2B engine is shut down, such as if a shutdown method is called on an associated WLCMBean, then all logic plug-ins running on that B2B engine can be shut down as well. The B2B engine and the delivery channel can be restarted.

If logic plug-in definitions change in the repository, such as when a chain is resequenced or when logic plug-in definitions are added, changed, or removed, then the delivery channel can be shut down and restarted to reflect the repository changes. The relevant server instance can be restarted, and the Java Virtual Machine (JVM) reloaded, if an upgraded version of logic plug-in source code is installed.

Developing and Administering Logic Plug-Ins

Implementing a custom logic plug-in can require a combination of development and administrative tasks. Although each logic plug-in can process business messages in its own way, all logic plug-ins can be required to perform certain tasks. To implement a logic plug-in, a user can first import any necessary packages, such as b2b.protocol and b2b.protocol.messaging. The following listing from a SentMsgCounter.java file shows how a user can import the necessary packages.

```
import java.util.Hashtable;
import com.bea.b2b.protocol.*;
import com.bea.b2b.protocol.messaging.*;
import com.bea.eci.logging.*;
import javax.naming.*;
import javax.sql.DataSource;
```

Next, a user can implement a plug-in interface. A logic plug-in can implement b2b.protocol.Plug-in interface, as shown in the following listing.

```
public class SentMsgCounter implements Plug-in
{
        . . .
}
```

A user can then specify an exception processing model. A Plug-inException can be thrown if, for example, a run-time exception, such as a NullPointerException, is thrown by a logic plug-in and caught by integration processing code. A logic plug-in can also throw an exception to indicate problems encountered during logic plug-in processing. The logic plug-in can handle the exception directly, or it can notify the integration processing code.

An exception processing model specified in a logic plug-in can determine what happens if an exception is thrown. Logic plug-ins can implement an exception processing model method and specify a return value. Possible return values can include EXCEPTION_CONTINUE, EXCEPTION_STOP, and EXCEPTION_UNWIND.

An EXCEPTION_CONTINUE return value can indicate that processing should not stop if a Plug-inException is thrown, but that it should continue to the next logic plug-in in the chain. This option can be used to allow a business message to continue being processed even if an error occurs while the logic plug-in is being executed.

An EXCEPTION_STOP return value can indicate that processing should stop at this logic plug-in if a Plug-inException is thrown. The business message may then not continue to the next logic plug-in in the chain. This option can be used to cancel message processing and prevent a message from being processed further. For example, a logic plug-in that is validating business documents can reject any documents that contain insufficient or incorrect data.

An EXCEPTION_UNWIND return value can indicate that processing should unwind if a Plug-inException is thrown. The business message will then not continue to the next logic plug-in in the chain. This option can be used to reject a message, to prevent any further progress through the B2B engine, and to undo any changes made by this plug-in, along with any changes made by previous plug-ins in the chain.

If an exception is thrown, the unwind methods in all previous plug-ins in the chain can be invoked in reverse order. In effect, unwinding can cancel all changes made by the chain. For example, if a logic plug-in inserts a row in a database table, the corresponding unwind method can delete that row. To use this exception processing model, all logic plug-ins in the chain can be required to implement the unwind method, even if the method does nothing.

If a business message is rejected, how that rejection is handled can depend on the business protocol, as well as on the specified "Quality of Service" associated with the message. For example, the B2B application that sent the message might be notified that message delivery failed, so that the application can attempt to send the business message again. The following listing shows how a SentMsgCounter plug-in can implement an exceptionProcessingModel method.

```
public int exceptionProcessingModel()
{
    return EXCEPTION_CONTINUE;
}
```

Next, a user can implement the Process Method. To process a business message, a logic plug-in can implement the process method, which can accept the message envelope of the business message as its only parameter. In the following listing, the SentMsgCounter class begins its implementation of the process method by defining the variables that it later uses to store message properties.

```
public void process(MessageEnvelope mEnv) throws Plug-
inException
{
    String sender, conversation;
    String tRecipient;
    Connection conn = null;
    Statement stmt = null;
    Message bMsg = null;
    ...
}
```

A user can then get a business message from the message envelope. If a logic plug-in needs to inspect the contents of a business message, the plug-in can call a getMessage method on a MessageEnvelope instance, which can retrieve the business message as a Message object. In the following listing, a SentMsgCounter class can get the business message from the message envelope by calling the getMessage method.

```
if((bMsg = mEnv.qetMessage()) == null)
{
    throw new Plug-inException("message is NULL");
}
```

A user can then validate the business message. A logic plug-in can determine whether a message is a valid business message that should be processed, or a system message that should be ignored by the logic plug-in. To check a business message, the logic plug-in can call an isBusinessMessage or similar method on a Message instance. In the following listing, the SentMsgCounter class uses the isBusinessMessage method.

```
if (bMsg.isBusinessMessage())
{
    ...
}
```

A user can then get the business message properties. A logic plug-in can retrieve certain properties of the business message by calling methods on the MessageEnvelope or Message instance. In the following listing, the SentMsgCounter class gets the name of the conversation definition associated with the conversation in which this message was sent, the name of the sender of the business message, and the name of the recipient trading partner.

```
conversation=   bMsg.getConversationType( ).getName ( );
sender      =              mEnv.getSender ( );
tRecipient = mEnv.getRecipient ( );
```

Finally, the business message can be processed as needed. After a logic plug-in obtains the required information from the business message, the plug-in can process this information as necessary. For example, a SentMsgCounter plug-in can update the billing database with the message statistics it has collected.

Administrative Tasks

An administrator can add a logic plug-in definition to the repository by performing the following examplary set of tasks, such as from a logic plug-ins page or tab of a B2B integration console. The administrator can specify the name of the logic plug-in, as well as the Java class that implements the Plug-in interface. This class can call auxiliary classes in the class library, but may need to be the main point of entry for the logic plug-in. In addition, the Java class file can reside in a location specified by the CLASSPATH. The administrator can also specify the parameter name/value pairs to use when initializing the Java class. The administrator can assign a logic plug-in to a business protocol, and can specify the position of the logic plug-in in the chain.

Workflow

A fundamental step in defining a conversation is creating the workflow that executes each role in the conversation. A Business-to-Business (B2B) integration component can utilize a plug-in that allows a user to create collaborative workflows, or public workflows. By using a B2B integration component together with the business process management (BPM) component, a user can have access to: a visual design tool for designing workflows (process models), which can reduce the time needed to develop business collaborations; a run-time process engine for executing workflows; and process monitoring capabilities. Creating workflows using a B2B integration plug-in can require a combination of design and administrative tasks, and optionally a set of programming tasks.

Figure 4:
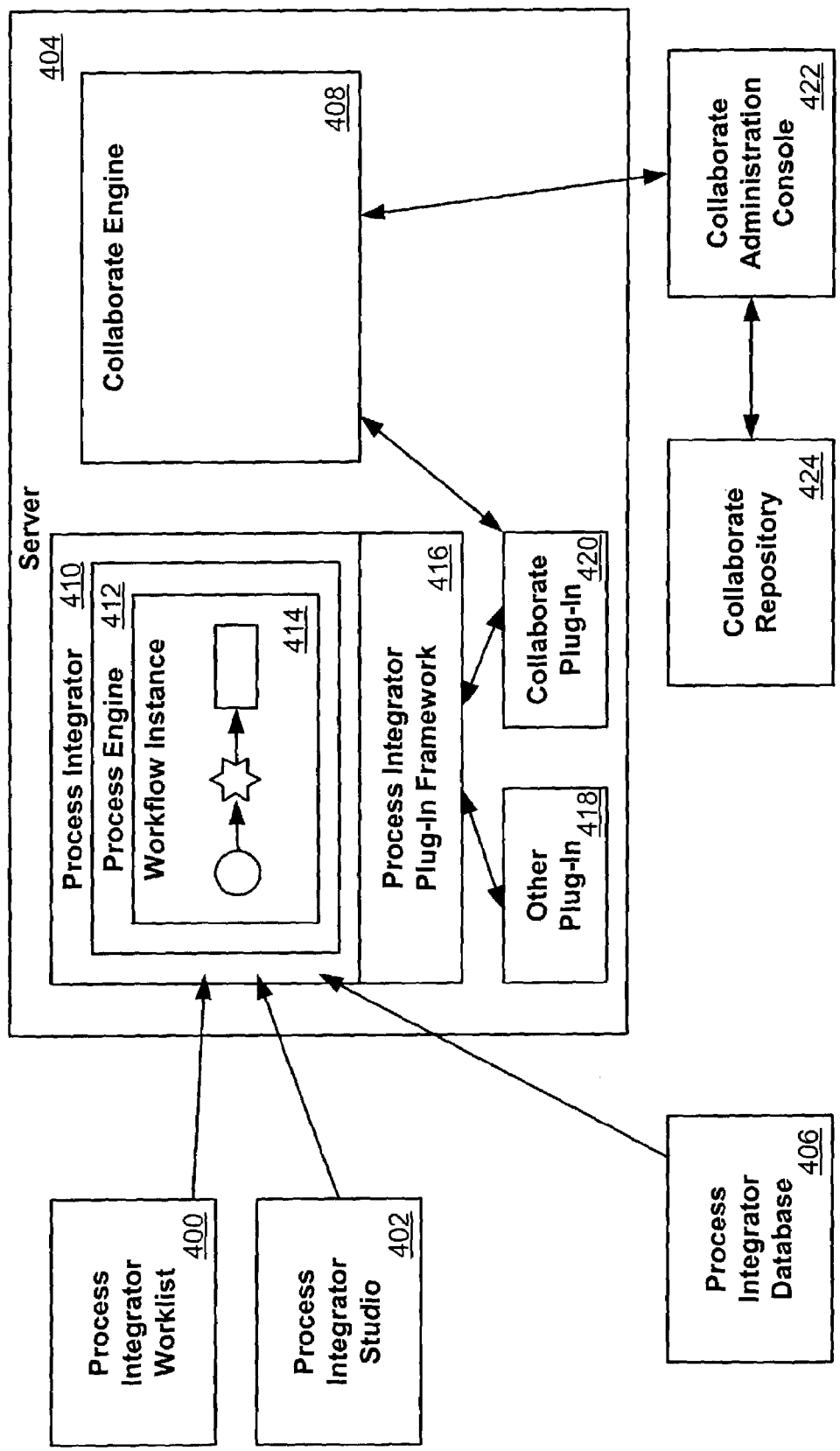
FIG. 4 is a diagram of an integration architecture in accordance with one embodiment of the present invention.

FIG. 4 shows how an integration architecture can incorporate an integration plug-in. An integration architecture can include several main components, including a server 404 and a process integrator 410, which facilitate the creation and execution of collaborative workflows. One such component is a process engine 412. A process engine is a run-time controller and workflow engine that can execute and manage workflows, and can track workflow instances. A workflow instance 414 can also be used, which can be a running instance of a workflow template definition. A workflow instance can implement a role of a conversation definition that is configured in an integration repository. A workflow instance can be created when a workflow template definition is instantiated at run time.

An integration architecture can also utilize client applications, such as an integration studio 402 or integration worklist 400. An integration studio 402 can be used at design time to define workflows and at run time to monitor running workflows. An integration worklist 400 can be used to view and perform tasks that are currently assigned to a user, or to roles to which the user belongs. Examples of such tasks can include reassigning tasks to other users, marking tasks as done, unmarking tasks done, viewing a workflow status, and manually starting a workflow.

Another component that can be used is an integration repository. An integration repository is an integration database 406 that can store workflow templates and instances, as well as conversation definition information used at run time, such as information about conversations, parties, conversation roles, and protocol bindings. The repository can reside locally on a trading partner node, or it can reside on a different node that is network accessible to the integration software. The repository can be deployed so that it is accessible to a single trading partner in one organization or to multiple trading partners in different organizations.

An integration architecture can also use a collaborate engine 408, or software that processes and routes messages among trading partners at run time. A collaborate administration console 422, or B2B integration console, can be used, which can be a browser-based component. Such a console can enable a user to create, configure, administer, and monitor collaboration agreements, conversations, delivery channels, document exchanges, and trading partners, for example. A collaborate repository 424 can be used, such as a database that stores conversation definition information used by the collaborate engine at run-time, such as information about conversations, parties, conversation roles, and protocol bindings. Process integrator 410 and the collaborate engine 408 can share the same database in some embodiments.

The architecture can utilize an integration plug-in framework 416. The framework is a component that can allow a specific set of software, such as may include integration, data integration, and application integration components, as well as Java Application-to-Mainframe (JAM) products and user-written software, to extend the functionality of the integration studio and the process engine.

Plug-ins can be used with the integration plug-in framework in order to provide for additional functionality. A B2B integration or collaborate plug-in 420 can extend the integration studio 402 to allow a user to specify workflow nodes, actions, events, and other details that are geared toward creating collaborative workflows, or workflows that implement individual roles in a conversation definition. A B2B plug-in can also integrate the process engine 412 with conversation flow. An integration plug-in framework can also support the incorporation of additional plug-ins. The framework 416 can also support other plug-ins 418 to extend functionality.

BPM Terminology and Concepts

Integration systems can utilize a workflow automation tool in the process engine. A workflow is essentially a business process in certain embodiments, and workflow automation is the automation of a business process, in whole or in part, during which information of any type is passed to the right participant at the right time according to a set of intelligent business rules that allow computers to perform most of the work while humans have to deal only with exceptions.

A collaborative workflow is a workflow that can implement the role for a trading partner in a conversation definition. A conversation definition can have two or more roles, each of which is associated with a collaborative workflow. Collaborative workflows that implement public processes are often referred to as public workflows. A collaborative workflow can be a public workflow if the workflow has not been customized to execute private processes. For the sake of simplicity, the terms collaborative workflow and public workflow can be considered interchangeable.

A workflow template can be a folder or container in the integration studio. This workflow template can represent a workflow and can be given a meaningful workflow name, such as Order Processing or Billing. The workflow template can aggregate various definitions or versions of its implementation, referred to as workflow template definitions. Further, a workflow template can be responsible for controlling which organizations can use the constituent workflow template definitions.

A workflow template definition is a definition or version of the workflow, which can be distinguished by its "effective" and "expiry" dates. At design time, the Studio can be used to define the properties that bind a workflow template definition to a role, such as buyer or seller, in a conversation. At run time, the process engine starts an instance or session of a workflow template definition, selecting the most effective definition, or at least a current and active definition.

B2B Terminology and Concepts

A conversation is a series of business message exchanges between trading partners that is predefined by a conversation definition. The receipt of a business message by a trading partner can cause any number of back-end processes to occur. A business message can consist of one or more business documents and, optionally, attachments.

A business document can be thought of as the XML-based payload part of a business message. An XML business document is normally associated with a corresponding document definition. One or more attachments can also be included with the business message and can be written in XML, although attachments can be written in formats such as binary, for example. To construct outgoing business messages or to process incoming business messages, a workflow can use a Compose Business Message, Extract Business Message Parts, or Manipulate Business Message action, as appropriate.

A conversation can involve an initiator who starts the conversation and participants who participate in the conversation once it has started. Each perspective can require a different type of collaborative workflow. A conversation initiator workflow can be defined to have conversation properties and a non-business message start property. This type of workflow can initiate and terminate the conversation. A conversation participant workflow can be defined to have conversation properties and a business message start property. This type of workflow can join and exit the conversation but may not be able to initiate or terminate the conversation.

When trading partners exchange business messages, both initiator and participant workflows typically send and receive business messages. It can be important to remember which parts of the workflow send business messages and which parts receive them. For example, a buyer might submit a bid request, or a business message, to a seller. In this case, the buyer workflow is sending the business message and the seller workflow is receiving it. When the seller replies to the request with a bid, another business message, then the roles are reversed: the seller workflow is the sender and the buyer is the recipient workflow.

The design tasks can differ depending on whether the workflow sends or receives business messages. However, in both cases, certain properties can be defined in the workflow template definition. The B2B integration plug-in offers two ways to work with business messages. The first way utilizes workflow actions that can compose or extract information from business messages that do not require any user-written application code to manipulate the business messages themselves. The second way involves workflow actions that invoke application code implementing a b2b.pi.MessageManipulator interface to either compose or extract information from business messages, which may be appropriate in situations where complex message handling is required.

To create workflows for conversation roles for integration, a B2B integration plug-in can be used. The first step in creating these workflows can be to define workflow templates and template definitions for those workflows. In addition to the standard properties for templates and template definitions, additional properties can be defined that allow the workflows based on those template definitions to be used in conversations.

Creating a Workflow Template

A B2B integration plug-in can be used to create a workflow template in an integration studio. Before using collaborative workflow to exchange business messages, a user should first link the workflow template to a particular conversation definition, such as a conversation name, version, role, and protocol, in the repository. The conversation name can specify the name of the conversation definition in the repository to link with this workflow template definition. The conversation version can specify the version number of the conversation definition in the repository to link with this workflow template definition. The role in the conversation can specify the role in the conversation definition to link with this workflow template definition. In order for a trading partner to receive messages in this conversation, it is registered in this role in the conversation at run time. Business Protocol can specify the business protocol for the conversation definition linked with this workflow template definition. The following business protocols, among others, can be available: XOCP-1.1, RosettaNet-2.0, and RosettaNet-1.1. If XOCP is chosen, an additional option can be specified so Quality of Service (QoS) settings can be selected for the business messages exchanged via the XOCP protocol. A conversation initiator option can be selected if the workflow starts a conversation.

Linking Templates to Collaboration Protocols

Linking a template to a specific protocol can affect what is seen in B2B integration plug-in dialog boxes, screens, and/or tabs throughout an integration studio. As various components of a B2B integration plug-in can be used to perform various tasks, such as defining workflow start properties, sending and receiving business messages, and terminating conversations, the appearance of each plug-in component varies, depending on the protocol chosen for the workflow template.

Certain properties can be specified if selecting a quality of service. A Delivery Confirmation property can specify the degree to which message delivery confirmation is required: such as Up to XOCP Hub, which may be the default, Up to XOCP Hub Router, or All Destinations. The selection can determine which options are available for Message Token Assignments. For Up to XOCP Hub, delivery confirmation is required when a message reaches the intermediary (default). This option can be selected to provide basic delivery confirmation with maximum run-time performance. For Up to XOCP Hub Router, delivery confirmation is required when a message reaches the router in the intermediary. This option can provide the list of trading partners selected by the router to receive the message. For All Destinations, delivery confirmation is required from all destinations. This option can be selected to provide the maximum delivery confirmation details. This can affect run-time performance.

A Durability option can also be specified, such that messages are saved in a persistent state. This option increases the likelihood of recovery from a system failure but requires additional processing that might affect run-time performance. If Message Persistence is not selected, messages are not saved in a persistent state. This option improves run-time performance but can reduce the likelihood of recovery from a system failure. A Number of Retries option specifies the maximum number of retries for sending a message. The default can be set to 0, for example. The integration process engine can repeatedly attempt to send a message until it either successfully sends the message or exceeds the maximum number of retries. An exception can be thrown if the maximum number of retries is exceeded.

A Correlation ID option can specify the message identification string that can be used to correlate the message with other business messages in the application. For example, a trading partner might want to specify a correlation ID in a request so that replies to that request can be matched to the original request. A B2B messaging service can include this property with the message. A Send Timeout option can specify a timeout value in days, hours, minutes, and seconds for sending a message. The default can be 0, which can mean that there is no timeout. The integration process engine can wait until either a delivery confirmation is received or the timeout period is exceeded. A Notes option can specify optional descriptive text.

Logging Messages

A B2B integration plug-in can provide a way to send messages, such as debug messages, run-time information, or application messages, to a B2B log at any point during the execution of a collaborative workflow. This functionality can be provided through a Log action, which can be added to any node in the workflow. This action can provide a useful debugging tool during the workflow design process.

About Working with Business Messages

A business message can consist of one or more business documents, which can represent the XML-based payload part of a business message. The payload can be the business content of a business message. A business message can also contain one or more attachments, which represent additional XML or non-XML payload parts of a business message.

A B2B integration plug-in can provide at least two methods to either create or extract the contents from business messages. Simple message manipulation can be supported by compose business message and extract business message parts actions. These two actions can provide a way to manipulate the contents of business messages non-programmatically. Complex message manipulation can be supported by a manipulate business message action. This action can start a user-written application that implements a MessageManipulator interface from a message manipulator API. This interface can enable a user to create and manipulate complex messages.

Defining the Workflow to Receive Business Messages

A workflow can receive a business message in various circumstances, such as when a conversation participant workflow is waiting for the initial business message sent by the conversation initiator workflow. The first business message can trigger the start node of the conversation, which can be defined as a business message start. A workflow can also receive a business message when a conversation initiator workflow or conversation participant workflow is waiting in an event node for another message, such as a reply to a request.

The following sections describe procedures for setting up a workflow to receive business messages for each of the protocols supported in one embodiment of a B2B integration plug-in. If a workflow waits to receive a business message, such as a reply to a request or a subsequent request, a user can define a business message receive event. This event can be triggered at run time when the appropriate business message is received in the conversation.

To define a Business Message Receive event, a user can display or add an event node using an integration studio. The user can select and set the event properties. The user can select a meaningful name for a receive business message event, and can select a collaboration event type. Which event properties are displayed can depend upon the protocol with which the workflow template has been configured. The following sections explain how to define a receive business event for protocols supported by a B2B integration plug-in, in accordance with the present invention.

If the workflow template is configured with the XOCP 1.1 protocol, certain event properties can be configured. One event property is the Event Type, which can allow a user to select "Incoming Business Message" or similar to define the event to wait for an incoming business message. A Target Variable can be specified to hold the name of a target workflow variable, such as of type Java Object, in which to store the business message. This can be a required field in some embodiments.

A Router Expression can hold the name of a workflow variable, such as of type String, in which to store an XPath expression. The value can represent the XPath expression used by the sender to send the message. This XPath expression can be used later, in a router expression, to publish a reply to the current message. A Sender Name variable can hold the name of a workflow variable, such as of type String, in which to store the name of the Trading Partner that sent the message.

If the Convert Sender's Name to XPath check box is selected, this name can be converted to an XPath expression. An XPath Conversion variable, which can be a Boolean, can indicate that the contents of the variable specified in the Sender's Name field are converted to an XPath expression suitable for use in the Send Business Message action. If the option is not selected, or is set to False, the sender's Name variable can be used as the actual name of the sending Trading Partner.

At run time, when the business message is received, the event can be triggered and the target variable is set to the business message that was just received. If a router variable is specified, it can contain an XPath expression that can be used to reply to the sender.

If the workflow template is configured with the RosettaNet 2.0 protocol, the display of an Event Properties dialog box, for example, can be refreshed with contents for a conversation event type. These can include a Content Variable, which can store the name of a target workflow variable of type XML in which to store the RosettaNet 2.0 XML business document content. The contents can also include an Attachment Descriptor Variable, which can contain the name of a target workflow variable of type XML in which to store the RosettaNet 2.0 message attachment content. At run time, when the business message is received, the event can be triggered and the target variables set to the business message that was just received.

To configure a Business Message Receive event for a RosettaNet 1.1 message, the user can select the name of a target workflow variable of type XML in which to store the RosettaNet 1.1 XML business document content. At run time, when the business message is received, the event can be triggered and the target variables are set to the business message that was just received.

A conversation is terminated when the conversation initiator workflow reaches a done state. Conversation participant workflows can end their participation in a conversation before the conversation is terminated. For a conversation initiator workflow, the user can define the conversation termination property (terminate with success or failure) for any done node in the workflow. Once a done node is reached in the workflow, the running instance of the workflow can be marked done, regardless of whether the active workflow has reached all the done nodes. A conversation initiator workflow can terminate a conversation, but other participants in the conversation may not be allowed.

A user can select a conversation termination option for Done Properties. A Success field can be selected if the conversation should be terminated with a SUCCESS result, which can be set as the default. The conversation can be terminated after the actions for this state are done. The SUCCESS result indicates that the workflow instance completed successfully. The participants of the conversation can be notified, if possible, that the conversation is being terminated.

A Failure option can be selected if the conversation should be terminated with a FAILURE result. The conversation can then be terminated after the actions for this state are done. The FAILURE result indicates that the workflow instance encountered conversation-specific or application-specific errors. The participants of the conversation can be notified, if possible, that the conversation is being terminated.

Integration Platform

An integration platform can be used to integrate business processes such as those that can span multiple corporate departments, multiple enterprises across the Internet, or both. An integration platform can support the building of mission-critical, scalable, real-world e-commerce collaborations. Platform features can include an open, nonproprietary architecture that leverages Java, J2EE, XML, HTTP, HTTPS, and other industry standards to allow rapid system and cross-platform integration, with low barriers to entry. A platform can include support for multiple business protocols, including XOCP, RosettaNet, and cXML, thus providing the ability to exchange business documents in a secure manner with a variety of trading partners, accommodating the complexity of heterogeneous platforms, different message structures, and different processes in various e-business environments.

A variety of connectivity options can also be included with a platform, allowing rapid connectivity among many trading partners for both automated and semi-automated interactions. Connectivity and subsequent business collaborations between trading partner applications can be possible entirely within an enterprise or a company, between trading partner applications across company firewalls and over the Internet, or in a combination of the two. The platform can support rapidly enabling trading partners through no-cost lightweight client connectivity, such as by using browser-based interfaces and file-sharing mechanisms.

The platform can use peer-to-peer and mediated messaging models. Peer-to-peer messaging can allow direct messaging between partners, and mediated messaging can support tasks such as message routing, message content filtering, and value-added services. The platform can also have tools and processes for the effective management of dynamic and diverse trading partner relationships. The platform can have robust support for secure, high-volume business transaction levels.

The platform can provide reliable, role-based XML messaging that supports enhanced send and receive capabilities, including support for large messages. Conversation coordination can be provided to manage the execution and interaction of trading partner applications within a conversation and to manage conversation life cycles.

The platform can include a business process management workflow automation tool, which can provide a flexible and dynamic process-based approach to integrate public and private business processes. The platform can be an SSL-based secure platform for conducting collaborations that supports digital signatures, digital receipts, non-repudiation, and mutual, or two-way, authentication using digital certificates among trading partners. The platform can use a data repository and a set of design and configuration tools to define and manage the metadata and conversation definitions required for B2B integration.

Such a platform can also provide the ability to build custom portals by leveraging personalization server components. The platform can function as a portal backbone, and can provide controlled and secure Web access to existing business data and applications. The platform can also provide support for existing applications, such as those based on CORBA, EJB, BEA Tuxedo, and COM+.

Managing Business Processes

Using workflows is one approach to composing business messages and choreographing their exchange in conversations. Alternatively, a user can write Java messaging applications that use an Integration Messaging API or a cXML API. Workflows can be business processes that span multiple applications, corporate departments, and business partners or trading partners behind a firewall and over the Internet. An enterprise's business processes can be divided into two broad categories: public and private.

Public processes can be interface processes. Their definitions and designs can be known, understood, and agreed upon by the organizations using them, and may be customized or standardized across an industry or industry segment, as in the case of RosettaNet Partner Interface Processes (PIPs). They can be part of a formal contract between trading partners that specifies the content and semantics of message interchanges. Different trading partners can implement these processes in different ways.

In the context of B2B integration, when collaborative workflows are to be reused in multiple conversations with different trading partners, the workflows can be designed as public processes.

Participants in a conversation can also implement private, non-collaborative workflows, which can integrate their back-end processing. Private processes can be the business processes conducted within an organization. Process definitions and designs can be specific to that organization, and may not be externally visible. Within trading partner enterprises, private processes can interface with public processes and with back-end business systems. In the context of public processes, private processes can be thought of as subworkflows or subprocesses that implement tasks that are part of the public workflow. For example, a trading partner may implement a private workflow that works in conjunction with a collaborative workflow and that implements the processes that occur locally to a trading partner, but that are not necessarily dictated by the conversation definition.

Business Process Management (BPM)

A business process management (BPM) component can be utilized, which can automate and integrate a business process by managing the sequence of activities in the process and invoking the appropriate resources required by the activities or steps in the process. The components of business process management can include a GUI workflow design tool, or integration studio, a GUI monitoring tool, or integration worklist, and a process engine that monitors and controls workflows.

In an integration environment, a collaborative workflow can implement a role in a conversation definition for a trading partner. Collaborative workflow templates can define the message choreography for a B2B conversation. One template can be defined for each role in the conversation definition.

A B2B integration BPM plug-in can extend the studio design tool with functionality that allows a user to create collaborative workflows for B2B integration. Using the plug-in functionality, a user can compose and extract the contents of business messages, specify the message delivery Quality of Service (QoS), and handle message tokens, for example.

Supporting Business Protocols

A business protocol can be associated with a business process, which can govern the exchange of business information between trading partners. It can specify the structure of business messages, how to process the messages, and how to route them to the appropriate recipients. A business protocol may also specify characteristics of messages related to persistence and reliability. A business protocol can be bound to a conversation definition and a delivery channel for a trading partner. A business protocol can be bound indirectly to a collaboration agreement through both the associated conversation definition and associated trading partner's delivery channel.

By providing the ability to send and receive messages according to these standard protocols, an enterprise can be given a great deal of flexibility and opportunity in organizing its B2B e-commerce by reducing the need for trading partners to standardize on any single protocol.

A user can also customize and extend the supported business protocols beyond their out-of-the-box functionality by using logic plug-ins. Logic plug-ins can be Java classes that intercept and process business messages at run time. An integration system can provide system logic plug-ins, which can be supplemented by writing custom logic plug-ins. The system logic plug-ins for XOCP can include XOCP Router and XOCP Filter. They can be directly involved in the processing of message recipients based on Xpath expressions in the repository. Custom logic plug-ins can perform a wide range of services that are unrelated to routing or filtering, as well as routing and filtering operations. For example, a custom logic plug-in might be used, for billing purposes, to track the number of messages sent from each trading partner.

XOCP

The extensible Open Collaboration Protocol (XOCP) is a specific business protocol that supports the standards-based ebXML Transport, Routing, and Packaging (TRP) protocol.

XOCP provides messaging characteristics such as message multicasting. Message multicasting is the ability of the XOCP messaging service to multicast a message from one trading partner to many trading partners, within the constraints of an existing conversation.

In one example in accordance with embodiments of the present invention, an integration system can be deployed in a hub-and-spoke configuration, where trading partners, configured as spokes, communicate via an intermediary, or through a trading partner configured as a hub. The business purpose of this e-community is participation in a Query Price and Availability conversation that has two roles: buyer and supplier. One trading partner is in the role of the buyer, and the others are suppliers. The buyer trading partner can, through the intermediary, multicast the Query Price and Availability message to all the trading partners who have agreements to be suppliers in a Query Price and Availability conversation with the intermediary.

Message payload definition independence can be obtained, as XOCP provides the flexibility for a user to specify both the vocabulary and business processes for messages for a given conversation so that they are a good fit for the relevant business requirements.

E-commerce conversations can be complex and long-lived. XOCP is designed to manage long-lived conversations. When a conversation terminates, all trading partners who are participating in that conversation can receive an end-of-conversation message, in order to manage conversation life cycle. A variety of QoS-related settings also allow a user to set and control the characteristics of XOCP messages being sent, such as the message durability. Message durability can specify whether a durable message store is to be used to guarantee the delivery of messages in the case of network, machine, or software failures. Message durability can be controlled at the message level by this QoS setting only when deploying the B2B engine in nonpersistent mode, in some embodiments.

When deploying a B2B engine in persistent mode, all state records, including messages, can be read from, and written to, a persistent storage database and are not cached in memory. Therefore, all messages can be persisted. In other words, in persistent mode, message durability can be controlled by the database-based state management mode rather than by the message durability QoS setting. Timeout can specify how long a trading partner application waits before terminating all processing related to the business message. A Retry Attempts parameter can control how many times a message should be resent in the presence of specific situations, such as timeouts, network failures, and so on. A Correlation ID parameter can set an additional business message property that can be used to correlate messages in a conversation. Quality of Service settings can be established on a per-conversation and a per-message basis.

Managing Systems and Applications

Figure 5:
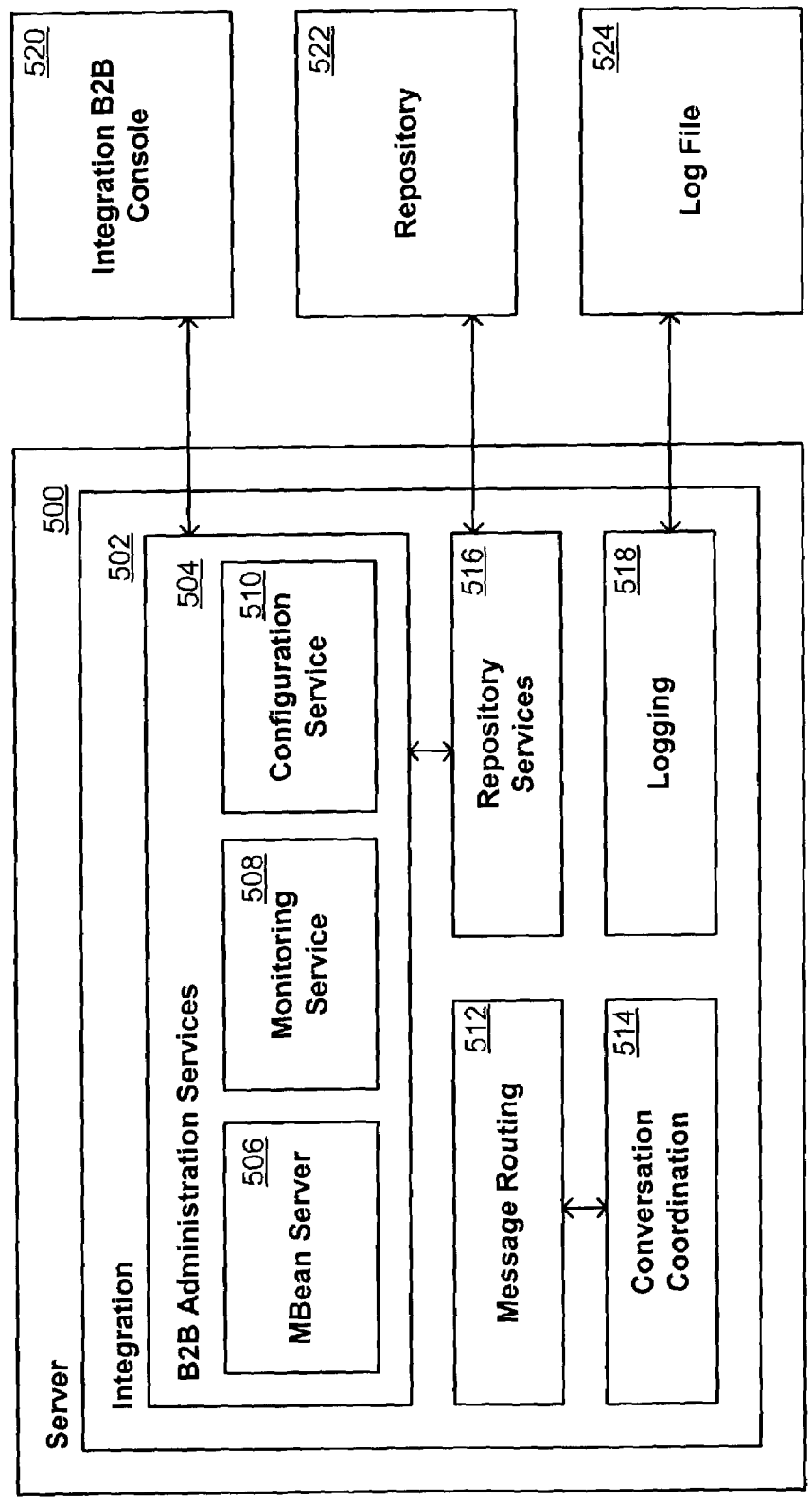
FIG. 5 is a diagram of a system that can be used in accordance with one embodiment of the present invention.

Workflow management can be achieved through a process engine that controls the execution of local business processes and manages the integration of back-end enterprise applications with business processes. Except for workflows, B2B integration components can be configured and managed primarily through a B2B Console, which can work together with a repository service. FIG. 5 shows exemplary B2B integration services that can be provided in accordance with one embodiment of the present invention. Integration 502 can be run on an appropriate server 500.

B2B administration services 504 can utilize an MBean server 506, a monitoring service 508, and a configuration service 510. Integration 502 can also utilize a messge routing component 512, a logging component 518, and a conversation coordination component 514. A repository service 516 can store data into the repository 522. This data can be required by trading partners to engage in business-to-business collaborations, and can include:

Trading partner-specific information
Conversation definitions
Collaboration agreements
Business protocol definitions
Document definition (DTD) names
Document and configuration information
Data used for message routing and filtering operations In addition, the repository 522 can be accessible through a B2B console 520 for system administration, creation of collaboration agreements by business developers, and monitoring of trading partners, conversations, and collaboration agreements. The repository service can support the import and export of data using a B2B console and a bulk loader utility. The repository service can also support various data stores, such as Oracle, Microsoft SQL Server, and Cloudscape.

Primary access to administration services 504 can be made through a Web-based B2B integration console 520, although the console need not be Web-based. All configuration information can be stored in an integration repository 522, which can be supported by a database management system. From the console, a user can configure and monitor components such as trading partners, conversations, collaboration agreements, business protocols, and logic plug-ins.

To facilitate data and business process exchange among trading partners, import and export functions of a B2B console can allow a user to export repository data to an XML file, and import data from an XML file to the integration repository. A user can select the scope of the exported data from the repository 522 such that the XML file created contains either all the data in the repository, or only data related to one of the following entities: trading partners, conversation definitions, collaboration agreements, business protocol definitions, or logic plug-ins.

Bulk Loader

In addition to using a B2B Console to export and import data to and from an integration repository, a Bulk Loader facility can be used, such as from a command line, to export and import repository data. Like the import and export functions of a B2B console, a bulk loader utility can support export of either all the data in the repository or only a subset of the data to the XML file.

B2B Integration Architecture

A B2B integration architecture can provide a robust framework that supports B2B integration, including messaging, connectivity, business protocols, and integration with business process management and workflow automation. It can include configuration models and B2B integration.

In order to participate in business transactions with a large set of trading partners who use diverse processes and protocols, an enterprise can require a variety of connectivity options. To that end, a trading partner can be configured to communicate in a number of different ways. Trading partner applications can communicate through their delivery channels either directly, in peer-to-peer mode, or through an intermediary delivery channel, in hub-and-spoke mode, or both. An integration architecture can simultaneously support multiple peer-to-peer relationships, and serve as a routing hub, mediating messages among other trading partners that deploy a B2B integration engine. Multiple messaging models can be overlaid on these configurations.

B2B Integration: A Walkthrough

Using a Query Price and Availability conversation as an example, this section describes one approach for setting up the integration components to allow a trading partner to participate in a conversation with another trading partner, showing how components can work together for B2B collaborations. The section also describes an exchange of business messages among trading partners participating in a conversation, showing how B2B integration can work.

For the purposes of this scenario, there are two business partners: Company ABC (the buyer) and Company XYZ (the supplier). In this scenario, Company ABC is responsible for preparing the integration environment to participate in this example business collaboration. Before going into production with Company XYZ, Company ABC tests the components of the collaboration in its own integration environment.

This example describes how Company ABC sets up two trading partners in its integration environment to participate in this business collaboration. The subsequent exchange of business messages among trading partners is described, as well as the steps both business partners take to exchange the data required before they can participate in the query price and availability conversation.

To specify the roles and other details of a conversation, a user can define a conversation using the B2B Console. The entity defined is known as a conversation definition. A conversation among trading partners is an active instance of a conversation definition.

In this example, an administrator for Company ABC can use a B2B console to create a conversation definition by first naming the conversation definition. In this example, the conversation definition is Query Price and Availability. An administrator can define the roles in the Query Price and Availability conversation, in this case the roles being buyer and supplier. XOCP can be referenced as the business protocol to be used in this conversation. The other choices can include cXML 1.1, cXML 1.2, RosettaNet 1.1, and RosettaNet 2.0. A collaborative workflow template name can then be attached to each role.

To design or edit workflow templates that implement conversation roles in a conversation, an integration studio can be used. A B2B integration BPM plug-in can be used, which can extend the functionality of the studio to support collaborative workflows. The studio allows assigning properties to the workflows. These properties can make the workflows usable in the B2B integration environment. In this example, an administrator from Company ABC uses the integration studio to create two collaborative workflow templates, one for each role in the conversation. These templates are QueryPriceAvailability_Buyer and QueryPriceAvailability_Supplier.

A trading partner can also implement private workflows that work in conjunction with a collaborative workflow and that implement local processes for a trading partner. Such processes are not necessarily dictated by the conversation definition. For example, in the case where a trading partner starts a conversation, that trading partner's private workflow can start the collaborative workflow to initiate the conversation.

To prepare collaborative workflows to exchange business messages, conversation properties can be specified for the collaborative workflow templates. These conversation properties can be specified in the integration studio using workflow template definitions.

To specify conversation properties for this example, the QueryPriceAvailability_Buyer collaborative workflow template can be identified as the Exchange Initiator. This specifies that the QueryPriceAvailability_Buyer workflow starts the conversation. The QueryPriceAvailability_Buyer template should be linked with the buyer role in the Query Price and Availability conversation, and the QueryPriceAvailability_Supplier template can be linked with the supplier role in the Query Price and Availability conversation. Run-time properties can be set for the workflow templates. Such properties can include general properties, such as template effective and expiry dates, as well as quality of service (QoS) properties, such as number of retries, timeouts, and confirmation of delivery options.

Enterprises that want to participate in a conversation may need to first configure their environments. This task can include creating a trading partner, as well as defining trading partner-specific information and one or more delivery channels. A delivery channel can describe a trading partner's message sending and receiving characteristics, including the business protocol to be used in the conversation, a transport protocol, and security parameters.

Using a B2B Console, an administrator for Company ABC can create two trading partners: Trading Partner A in the buyer role for the conversation, and Supplier-Test in the supplier role for the conversation. Supplier-Test can be used for testing the conversation and workflows before bringing the system up for production with a trading partner, in the role of supplier, from Company XYZ. The information to create each trading partner can include:

Name: Trading Partner A and Supplier-Test

Type: Local

Contact information: Address, email, phone, fax, and so on

Party ID: A unique name that identifies the trading partner in a collaboration agreement (for example, DUNS A12345678)

Delivery channels for Trading Partner A

Delivery channel for Supplier-Test

Trading Partner A can require two delivery channels: one spoke and one routing proxy. The Spoke Delivery Channel can contain a document exchange and a transport. The Document Exchange can define the business protocol (XOCP) and run-time parameters. The transport defines the transport protocol (HTTP), end point URI (for example, http://CompanyABC.com/xocp-spoke-transport), and security parameters. The Routing Proxy Delivery Channel contains a document exchange and a transport. The Document Exchange defines the business protocol (XOCP) and run-time parameters, while the transport defines the transport protocol (HTTP), end point URI (for example, http://CompanyABC.com/xocp-hub-transport), and security parameters.

The Supplier-Test trading partner can require one spoke delivery channel. The delivery channel definition can contain the information such as a Document Exchange parameter that defines the business protocol for this trading partner (XOCP) and run-time parameters. A Transport parameter can define the transport protocol, such as HTTP, end point URI (such as http://CompanyABC.com/xocp-spoke-transport), and security parameters After Company XYZ installs the integration software, an administrator can use the B2B Console to create a trading partner: Trading Partner Z in the supplier role. The information to create Trading Partner Z can include:

Name: Trading Partner Z

Type: Local

Contact information: Address, email, phone, fax, and so on

Party ID: A unique name that identifies the trading partner in a collaboration agreement (for example, DUNS Z87654321)

Delivery channel

Trading Partner Z can require one spoke delivery channel. The delivery channel definition can contain information such as a Document Exchange parameter that defines the business protocol for this trading partner (XOCP) and run-time parameters. A Transport parameter can define the transport protocol, such as HTTP, end point URI (such as http://CompanyX-YZ.com/xocp-spoke-transport), and security parameters.

Company ABC can use the Supplier-Test trading partner to test the collaboration agreement for the Query Price and Availability conversation before connecting with Company XYZ's trading partner, who will be the supplier in the real-life scenario.

A collaboration agreement can bind the trading partners' delivery channels to the conversation definition. It is through this collaboration agreement that trading partners agree on the interactions between them, in particular, the conversation in which they participate and each trading partner's message sending and receiving characteristics.

An administrator can use a B2B Console to create a collaboration agreement, with a specific name and version, in its repository. A collaboration agreement can define a party for each trading partner participating in the agreement, and can include a unique party identifier for each party to the collaboration agreement. The agreement also can contain the delivery channel information for each trading partner. The delivery channels can define the business protocol for the collaboration, the run-time parameters for each trading partner, the transport protocol, the end point (URI) for each trading partner's transport, and security parameters. The agreement can contain the conversation definition, which names the business collaboration (in this case, Query Price and Availability), and attaches the roles (for example, buyer and supplier) to collaborative workflow templates.

Company ABC can create two collaboration agreements. In agreement QueryPrice-A-A, the parties can act as the Trading Partner A routing proxy delivery channel, as well as the Trading Partner A spoke delivery channel. In agreement QueryPrice-A-SpTest, the parties are the Trading Partner A routing proxy delivery channel and the Supplier-Test spoke delivery channel. Each trading partner can have a collaboration agreement with the routing-proxy delivery channel. The routing proxy can act as an intermediary; that is, it can act as the proxy supplier in its collaboration agreement with Trading Partner A, and as a proxy buyer in its collaboration agreement with Supplier-Test. The collaboration agreements can bind the delivery channels to the conversation definition, and they can reference the collaborative workflow templates that are associated with the roles in the conversation definition.

The routing-proxy delivery channel can be a party in both collaboration agreements. In the QueryPrice-A-A agreement, the routing-proxy delivery channel is in the role of (proxy) supplier, and in the QueryPrice-A-SpTest agreement, it is in the role of (proxy) buyer. The parties in the collaboration agreements are associated with the roles in the conversation definition. The conversation definition associates the collaborative workflow template for each role in the conversation with the parties in the collaboration agreement.

After the workflow templates, the conversation definition, the trading partners, the delivery channels, and the collaboration agreements have been created, Company ABC can test its collaboration agreements and conversation using Trading Partner A in the buyer role, and Supplier-Test in the supplier role for the Query Price and Availability conversation.

Business messages can be processed through the trading partner applications and delivery channels. The events are described in the following exemplary sequence of steps.

The Trading Partner A application can begin the conversation by starting an instance of a private workflow which subsequently starts the collaborative workflow defined for the buyer role in the conversation. This collaborative workflow is named QueryPriceAvailability_Buyer.

The QueryPriceAvailability_Buyer collaborative workflow can associate itself with the collaboration agreement QueryPrice-A-A. In the QueryPrice-A-A collaboration agreement, the spoke delivery channel is the buyer and the routing proxy delivery channel is the supplier. Therefore the spoke delivery channel can send the message to the routing proxy delivery channel.

The routing proxy delivery channel can be responsible for linking collaboration agreements. That is, a message can arrive as part of a collaboration agreement and can be routed to another trading partner as part of another collaboration agreement. The collaboration agreements can be linked because they can use the same routing proxy delivery channel. In this case they can use a transport such as http://CompanyABC.com/xocp-hub-transport.

When the routing proxy delivery channel receives this message, it can be acting as the proxy supplier for the QueryPrice-A-A collaboration agreement. It then can change roles and become the proxy buyer. The Trading Partner A application can use this common (routing proxy) delivery channel to find the collaboration agreements for the conversations in which it is acting as the buyer. In this case, the message is sent to the Supplier-Test's spoke delivery channel as part of the QueryPrice-A-SpTest collaboration agreement. Note that the routing proxy delivery channel is in the role of proxy buyer in the QueryPrice-A-SpTest collaboration agreement.

The Supplier-Test delivery channel can use the collaboration agreement ID in the message to identify the collaborative workflow for the supplier role, QueryPriceAvailability_Supplier. The message can start the QueryPriceAvailability_Supplier workflow. The QueryPriceAvailability_Supplier collaborative workflow can extract the message and send an event to a private workflow implemented by the Supplier-Test trading partner. The private workflow can transform the request message to a response message and send an event back to the QueryPriceAvailability_Supplier collaborative workflow.

The QueryPriceAvailability_Supplier workflow can send a reply message and terminate. Based on the roles defined in the QueryPrice-A-SpTest collaboration agreement (the Supplier-Test delivery channel is the supplier and the routing proxy delivery channel is the proxy buyer), the reply message can be sent to the Trading Partner A routing proxy delivery channel.

Trading Party A can again change roles and become the proxy supplier. It can use the routing proxy delivery channel to find the collaboration agreements for the conversations in which it is acting as the buyer. In this case, the message can be sent back to the Trading Partner A spoke delivery channel as part of the QueryPrice-A-A collaboration agreement.

The spoke delivery channel can send the message to the QueryPriceAvailability_Buyer collaborative workflow which, in turn, extracts the message and sends a Done event to the Trading Partner A private workflow.

To participate in B2B collaborations, enterprises can share information. In the B2B example walkthrough described throughout this section, after Company ABC successfully tests its Query Price and Availability conversation, it can prepare for production, or set up a Query Price and Availability conversation with Company XYZ.

A B2B console can provide an export facility that allows an enterprise to export data from its repository to an XML file. The XML file can then be imported into another integration repository, again using the B2B Console. The scope of the exported file can be selected such that a user can export all or a subset of the repository data. These export and import facilities are used by companies to share the information they need to set up B2B collaborations.

In the example, Company ABC can complete the following exemplary tasks to prepare for business transactions with Company XYZ. First, ABC can import the Trading Partner Z data. Company XYZ can have generated the data for Trading Partner Z and exported it to an XML file.

ABC can use the B2B Console to change Trading Partner Z's trading partner type from Local to Remote. A collaboration agreement can then be created between itself and Company XYZ. This is similar to the collaboration agreements described in above, except that the data for Company XYZ's Trading Partner Z is used, instead of the Supplier-Test trading partner and delivery channel data. ABC then can export a copy of the newly created collaboration agreement using the B2B Console. ABC also can export, or publish, the QueryPriceAvailability_Supplier collaborative workflow template and document schemas from the integration studio.

Company XYZ can then complete tasks such as the following to prepare for business transactions with Company ABC. XYZ can import the collaboration agreement prepared by Company ABC. XYZ then use the B2B Console to change the aspects of the data imported from Company ABC, including changing Trading Partner Z's trading partner type from Local to Remote, and setting the Organization defined for Company ABC's role (QueryPriceAvailability_Supplier) in the Query Price and Availability conversation definition.

XYZ then can import the QueryPriceAvailability_Supplier collaborative workflow template and document schemas, which were published by Company XYZ from the integration studio. XYZ creates a private workflow that works in conjunction with the QueryPriceAvailability_Supplier collaborative workflow. This private workflow implements the processes that occur locally to Trading Partner Z in its role as the supplier. These processes are. not necessarily dictated by the conversation definition.

When these steps are complete, each trading partner's repository can have the information necessary to implement its role in the conversation definition. The Trading Partner A application can begin the conversation by starting an instance of a private workflow, which subsequently starts the collaborative workflow defined for the buyer role in the conversation. This collaborative workflow is named QueryPriceAvailability_Buyer. Business messages are exchanged between Trading Partner A and Trading Partner Z applications, and the conversation progresses.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system, comprising:
   one or more processors;
   a plug-in framework, wherein the plug-in framework includes a plug-in manager and a set of interfaces for plug-ins to implement;
   a process engine to execute and manage workflows, and wherein the process engine executes one or more business logic plug-ins which process business messages, wherein the one or more business logic plug-ins include a home interface that allows the plug-in manager to detect deployed business logic plug-ins by traversing a naming and directory tree, and wherein the plug-manager manages all of the plug-ins in the framework and the plug-in manager is the central hub through which all plug-in related client requests are routed;
   an integration studio, wherein an integration studio can be used at design time to define workflows and at run time to monitor running workflows;
   an integration framework, wherein the integration framework provides router logic plug-ins and filter logic plug-ins for at least one protocol used for the business messages; and
   an integration repository, wherein the integration repository is a database that can store workflow templates and workflow instances,
   wherein at least one of the workflow instances is a collaborative workflow that implements a role of a conversation definition configured in a collaborate repository, and the integration framework also provides a collaborative plug-in to allow a user to create the collaborative workflow.

2. The system of claim 1, wherein the integration engine is a messaging engine.

3. The system of claim 2, wherein the messaging engine is for business-to-business (B2B) messaging.

4. The system of claim 1, wherein the one or more business logic plug-ins can respond to workflow instances, lifecycle notifications, template, and template definition lifecycle notifications.

5. The system of claim 1, wherein the plug-in manager traverses the naming and directory tree at startup to obtain a list of deployed plug-ins and initializes each plug-in.

6. The system of claim 1, wherein a plug-in has a remote interface, comprising the following groups of methods: lifecycle control methods, event methods, metadata and other plug-in information methods, and object manufacturing methods.

7. The system of claim 1, wherein plug-in data adheres to an XML DTD.

8. The system of claim 1, wherein a business message is a basic unit of communication that can be exchanged between trading partners in a conversation.

9. The system of claim 1, wherein the router logic plug-in is on the "send" side of message processing and determines the intended recipients for the message.

10. The system of claim 1, wherein the integration engine can specify a message XML Path Language (XPath) expression that defines intended recipients of a business message from a sender.

11. The computer-implemented method of claim 1, wherein the plug-in framework has administrative capacity that detects and configures plug-ins loaded simultaneously.

12. The computer-implemented method of claim 1, wherein the plug-in framework allows plug-ins to extend properties for template and template definition nodes, allows plug-ins to add new actions and functions, and allows plug-ins to define new types of start, event, and done nodes.

13. The system of claim 1, wherein the plug-in framework has administrative capacity that detects and configures plug-ins loaded simultaneously.

14. The system of claim 1, wherein the plug-in framework allows plug-ins to extend properties for template and template definition nodes, allows plug-ins to add new actions and functions, and allows plug-ins to define new types of start, event, and done nodes.

15. A computer-implemented method, comprising:
providing a plug-in framework, wherein the plug-in framework includes a plug-in manager and a set of interfaces for plug-ins to implement;
executing and managing workflows through a process engine on one or more processors;
monitoring running workflows with an integration studio, wherein the integration studio can be used at design time to define workflows;
associating one or more business logic plug-ins with a home interface that allows the plug-in manager to detect deployed business logic plug-ins by traversing a naming and directory tree, and wherein the plug-manager manages all of the plug-ins in the framework and the plug-in manager is the central hub through which all plug-in related client requests are routed;
executing one or more business logic plug-ins;
processing business messages passing through an integration engine by inserting rules and business logic;
providing router logic plug-ins and filter logic plug-ins for at least one protocol used for the business messages;
defining and storing workflow templates and workflow instances in an integration repository; and
providing a collaborative plug-in to allow a user to create a collaborative workflow, wherein the collaborative workflow implements a role of a conversation definition configured in a collaborate repository.

16. The computer-implemented method of claim 15, wherein the integration engine is a messaging engine.

17. The computer-implemented method of claim 16, wherein the messaging engine is for business-to-business (B2B) messaging.

18. The computer-implemented method of claim 15, wherein the one or more business logic plug-ins can respond to workflow instances, lifecycle notifications, template, and template definition lifecycle notifications.

19. The computer-implemented method of claim 15, wherein the plug-in manager traverses the naming and directory tree at startup to obtain a list of deployed plug-ins and initializes each plug-in.

20. The computer-implemented method of claim 15, wherein a plug-in has a remote interface, comprising the following groups of methods: lifecycle control methods, event methods, metadata and other plug-in information methods, and object manufacturing methods.

21. The computer-implemented method of claim 15, wherein plug-in data adheres to an XML DTD.

22. The computer-implemented method of claim 15, wherein a business message is a basic unit of communication that can be exchanged between trading partners in a conversation.

23. The computer-implemented method of claim 15, wherein the router logic plug-in is on the "send" side of message processing and determines the intended recipients for the message.

24. The computer-implemented method of claim 15, wherein the integration engine can specify a message XML Path Language (XPath) expression that defines intended recipients of a business message from a sender.

* * * * *

UNITED STATES PATENT AND TRADEMARK OFFICE
CERTIFICATE OF CORRECTION

PATENT NO. : 7,627,631 B2  Page 1 of 1
APPLICATION NO. : 10/404296
DATED : December 1, 2009
INVENTOR(S) : Mike Blevins It is certified that error appears in the above-identified patent and that said Letters Patent is hereby corrected as shown below:

Title page, item (*) Notice: should read as follows: Subject to any disclaimer, the term of the patent is extended or adjusted under 35 U.S.C. 154(b) by 965 days.

On page 2, in column 2, under "U.S. Patent Documents", line 45, delete "Bau" and insert -- Bau, III, et al. --, therefor.

On page 3, in column 2, under "Other Publications", line 10, delete "Resuse" and insert -- Reuse --, therefor.

In column 2, line 25, delete "plugin" and insert -- plug-in --, therefor.

In column 4, line 36-44, below "manufacturing." delete "In order to expose plug-in properties specific to integration design-time clients, an abstract class such as InfoObject and a family of subclasses can be used. An info object class can have fields to hold the name of the plug-in, a plug-in-assigned identifier, a localized description exposed to and used by the user interface, and an array of fully qualified Java class named that the info object references that can be used for object manufacturing.".

In column 5, line 56, delete "extensible" and insert -- eXtensible --, therefor.

In column 15, line 7, delete "migh" and insert -- might --, therefor.

In column 17, line 58, delete "mEnv.qetMessage())" and insert -- mEnv.getMessage()) --, therefor.

In column 18, line 34, delete "examplary" and insert -- exemplary --, therefor.

In column 26, line 65, delete "extensible" and insert -- eXtensible --, therefor.

In column 28, line 1, delete "messge" and insert -- message --, therefor.

In column 30, line 60, after "parameters" insert -- . --.

Signed and Sealed this

Fourteenth Day of September, 2010

David J. Kappos
*Director of the United States Patent and Trademark Office*